United States Patent
Oda et al.

(10) Patent No.: US 10,465,063 B2
(45) Date of Patent: Nov. 5, 2019

(54) POLYAMIDE RESIN COMPOSITION FOR DAMPING MATERIAL

(71) Applicant: KAO CORPORATION, Tokyo (JP)

(72) Inventors: Yoshiro Oda, Wakayama (JP); Tomoya Tsuboi, Sakai (JP); Yoshinori Hasegawa, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/521,031

(22) PCT Filed: Oct. 20, 2015

(86) PCT No.: PCT/JP2015/079493
§ 371 (c)(1),
(2) Date: Apr. 21, 2017

(87) PCT Pub. No.: WO2016/067962
PCT Pub. Date: May 6, 2016

(65) Prior Publication Data
US 2017/0313856 A1 Nov. 2, 2017

(30) Foreign Application Priority Data

Oct. 31, 2014 (JP) .................................. 2014-222119
Jun. 8, 2015 (JP) .................................. 2015-116064

(51) Int. Cl.
| | | |
|---|---|---|
| C08K 5/435 | (2006.01) | |
| C08K 3/34 | (2006.01) | |
| C08K 3/40 | (2006.01) | |
| C08K 5/10 | (2006.01) | |
| C08K 7/02 | (2006.01) | |
| B29C 45/00 | (2006.01) | |
| C08K 7/00 | (2006.01) | |
| C08K 5/101 | (2006.01) | |
| C08L 77/02 | (2006.01) | |
| C08L 77/06 | (2006.01) | |
| C08K 3/30 | (2006.01) | |
| C08K 5/00 | (2006.01) | |
| C08K 5/105 | (2006.01) | |
| C08K 5/134 | (2006.01) | |
| C08K 3/013 | (2018.01) | |
| C08K 7/14 | (2006.01) | |
| C08K 3/22 | (2006.01) | |
| C08K 3/26 | (2006.01) | |
| B29K 77/00 | (2006.01) | |
| B29K 105/00 | (2006.01) | |
| B29K 509/02 | (2006.01) | |
| B29K 509/08 | (2006.01) | |

(52) U.S. Cl.
CPC .......... *C08K 5/435* (2013.01); *B29C 45/0001* (2013.01); *C08K 3/30* (2013.01); *C08K 3/34* (2013.01); *C08K 3/346* (2013.01); *C08K 5/0083* (2013.01); *C08K 5/101* (2013.01); *C08K 5/105* (2013.01); *C08K 5/1345* (2013.01); *C08K 7/00* (2013.01); *C08K 7/02* (2013.01); *C08L 77/02* (2013.01); *C08L 77/06* (2013.01); *B29K 2077/00* (2013.01); *B29K 2105/0038* (2013.01); *B29K 2509/02* (2013.01); *B29K 2509/08* (2013.01); *B29K 2995/0082* (2013.01); *B29K 2995/0091* (2013.01); *C08K 3/013* (2018.01); *C08K 5/0016* (2013.01); *C08K 7/14* (2013.01); *C08K 2003/2227* (2013.01); *C08K 2003/2296* (2013.01); *C08K 2003/265* (2013.01); *C08K 2003/3045* (2013.01); *C08K 2201/016* (2013.01)

(58) Field of Classification Search
USPC ....... 524/167, 186, 304, 306, 315, 423, 425, 524/449, 451, 606
See application file for complete search history.

(56) References Cited

U.S. PATENT DOCUMENTS

| | | | | |
|---|---|---|---|---|
| 4,980,407 A | * | 12/1990 | Okumoto | ................ C08L 77/00 524/449 |
| 5,886,094 A | | 3/1999 | Sanada et al. | |

(Continued)

FOREIGN PATENT DOCUMENTS

| | | |
|---|---|---|
| EP | 0 337 443 A1 | 10/1989 |
| EP | 1571176 A1 | 9/2005 |

(Continued)

OTHER PUBLICATIONS

Extended European Search Report dated Mar. 2, 2018 for European Application No. 15854438.7.

(Continued)

*Primary Examiner* — Tae H Yoon
(74) *Attorney, Agent, or Firm* — Birch, Stewart, Kolasch & Birch, LLP

(57) ABSTRACT

A polyamide resin composition for a vibration-damping material, containing a polyamide resin, a plasticizer in an amount of from 7 to 35 parts by mass, and one or more members selected from the group consisting of plate-like fillers and acicular fillers in an amount of from 15 to 80 parts by mass, based on 100 parts by mass of the polyamide resin. The polyamide resin composition of the present invention can be suitably used as a vibration-damping material for a material for audio equipment such as, for example, speakers, television, radio cassette players, headphones, audio components, or microphones, and manufactured articles such as electric appliances, transportation vehicles, construction buildings, and industrial equipment, or parts or housing thereof.

13 Claims, 1 Drawing Sheet

(56) References Cited

U.S. PATENT DOCUMENTS

| | | | |
|---|---|---|---|
| 7,038,006 B2* | 5/2006 | Ogawa | C08G 69/26 |
| | | | 528/310 |
| 2003/0165643 A1* | 9/2003 | Higuma | B41M 5/506 |
| | | | 428/32.1 |
| 2004/0068090 A1 | 4/2004 | Ogawa et al. | |
| 2005/0215703 A1 | 9/2005 | Mukasa et al. | |
| 2008/0026245 A1 | 1/2008 | Saga | |
| 2008/0026246 A1 | 1/2008 | Saga et al. | |
| 2010/0175802 A1* | 7/2010 | Morooka | B32B 25/08 |
| | | | 152/450 |
| 2015/0018468 A1 | 1/2015 | Sawada et al. | |
| 2016/0314776 A1 | 10/2016 | Takenaka et al. | |

FOREIGN PATENT DOCUMENTS

| | | |
|---|---|---|
| JP | 51-41080 A | 4/1976 |
| JP | 1-263151 A | 10/1989 |
| JP | 3-263457 A | 11/1991 |
| JP | 4-89863 A | 3/1992 |
| JP | 5-202287 A | 8/1993 |
| JP | 9-279012 A | 10/1997 |
| JP | 10-130451 A | 5/1998 |
| JP | 10-205576 A | 8/1998 |
| JP | 2000-178429 A | 6/2000 |
| JP | 2000-198974 A | 7/2000 |
| JP | 2001-220501 A | 8/2001 |
| JP | 2004-149769 A | 5/2004 |
| JP | 2004-204104 A | 7/2004 |
| JP | 2005-187747 A | 7/2005 |
| JP | 2006-22238 A | 1/2006 |
| JP | 2006-70154 A | 3/2006 |
| JP | 2006-117818 A | 5/2006 |
| JP | 2006-152020 A | 6/2006 |
| JP | 2007-9143 A | 1/2007 |
| JP | 2009-544799 A | 12/2009 |
| JP | 2009-544808 A | 12/2009 |
| JP | 2016-53145 A | 4/2016 |
| JP | 2016-89148 A | 5/2016 |
| JP | 2016-89149 A | 5/2016 |
| SU | 1423567 | 9/1988 |
| WO | WO 2010/084845 | 7/2010 |
| WO | WO 2013/125359 A1 | 8/2013 |
| WO | WO 2014/034636 A1 | 3/2014 |

OTHER PUBLICATIONS

Sperling, "Basic Viscoelastic Definitions and Concepts", Sound and Vibration Damping with Polymers, Chapter 1, ACS Symposium Series, American Chemical Society, Washigton, D.C., XP-002778133, May 1, 1990, pp. 5-22.

International Search Report (form PCT/ISA/210) dated Jan. 26, 2016 for International Application No. PCT/JP2015/079492.

International Search (PCT/ISA/210) Report dated Jan. 26, 2016 for Application No. PCT/JP2015/079493.

Extended European Search Report issued in corresponding European Application No. 15854259.7 dated May 7, 2018.

Chinese Office Action and Search Report for Chinese Application No. 201580057060.X, dated May 22, 2018, with English translations.

* cited by examiner

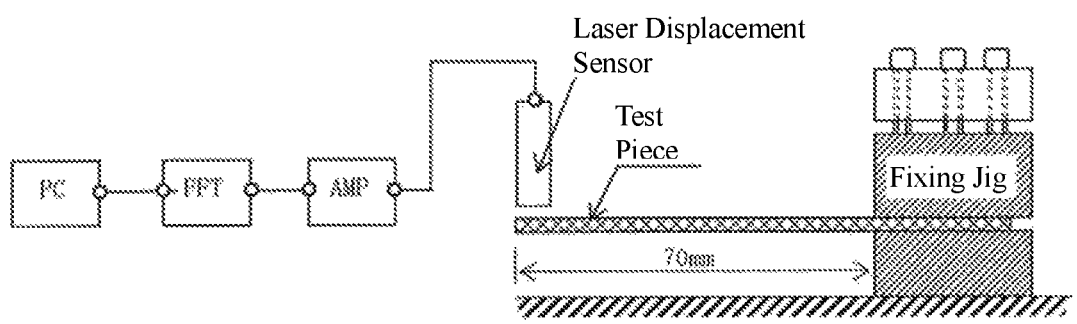

POLYAMIDE RESIN COMPOSITION FOR DAMPING MATERIAL

This application is the national phase under 35 U.S.C. § 371 of international application PCT/JP2015/079493, filed Oct. 20, 2015. This application claims priority to application 2015-116064, filed in Japan on Jun. 8, 2015 and to application 2014-222119, filed in Japan on Oct. 31, 2014.

FIELD OF THE INVENTION

The present invention relates to a polyamide resin composition for a vibration-damping material. More specifically, the present invention relates to a vibration-damping material obtainable by molding the polyamide resin composition, and use of the material in audio equipment, electric appliances, transportation vehicles, construction buildings, and industrial equipment.

BACKGROUND OF THE INVENTION

In the recent years, vibration countermeasures for various kinds of equipment are in demand, and especially, vibration countermeasures are needed in fields such as automobiles, domestic electric appliances, and precision instruments. In general, materials having high vibration-damping properties include composite materials such as materials in which a metal plate is pasted with a vibration-absorbable material such as a rubber and asphalt, a vibration damping steel plate in which a vibration-absorbable material is interposed between metal plates. These vibration-damping materials retain their shapes with a high-rigidity metal plate and absorb vibrations with a vibration-absorbable material. Also, in a case of metals alone, a vibration-damping material includes an alloy material that absorbs vibrations by converting kinetic energy to thermal energy utilizing twinning or ferromagnetic property. However, there were some disadvantages that since composite materials paste together different materials, there are limitations in mold processability, and also that a metal steel plate is used, so that the manufactured article itself becomes heavy.

In addition, the alloy material was heavy because only metals were used, and further it was insufficient in vibration-damping properties.

In view of the prior art as mentioned above, as a functional resin composition that has a vibration-damping function, for example, Patent Publication 1 discloses a sound insulation material constructed from a polyamide resin, a plasticizer in an amount of from 5 to 40 parts by weight, and reinforcing fibers in an amount of from 10 to 70 parts by weight, based on 100 parts by weight of the polyamide resin. Here, the publication describes that as a reinforcing material, reinforcing fibers such as glass fibers, aramid fibers, carbon fibers, and whiskers are used, but also a filler such as iron oxide, alumina, or zinc oxide can be used in combination.

In addition, Patent Publication 2 discloses that vibration-damping property and flowability are largely improved by blending a polyamide resin with a polyamide monomer and/or a nonamer or lower polyamide oligomer in a specified amount. It is possible to blend a plasticizer or an inorganic filler to the above composition, and 45 parts by weight of glass fibers are blended based on 100 parts by weight of the resin in Examples.

Patent Publication 1: Japanese Patent Laid-Open No. Hei-4-89863

Patent Publication 2: Japanese Patent Laid-Open No. 2006-70154

SUMMARY OF THE INVENTION

The present invention relates to the following [1] to [5]:
[1] A polyamide resin composition for a vibration-damping material, containing
a polyamide resin,
a plasticizer in an amount of from 7 to 35 parts by mass, and
one or more members selected from the group consisting of plate-like fillers and acicular fillers in an amount of from 15 to 80 parts by mass, based on 100 parts by mass of the polyamide resin.
[2] A vibration-damping material containing a polyamide resin composition as defined in the above [1].
[3] Use of a polyamide resin composition as defined in the above [1] as a vibration-damping material.
[4] A manufactured article selected from audio equipment, electric appliances, transportation vehicles, construction buildings, and industrial equipment, obtainable by molding a polyamide resin composition as defined in the above [1], or parts or housing thereof.
[5] A method for producing parts or housing, including the following steps:
step (1): melt-kneading a polyamide resin composition containing
a polyamide resin,
a plasticizer in an amount of from 7 to 35 parts by mass, and
one or more members selected from plate-like fillers and acicular fillers in an amount of from 15 to 80 parts by mass, based on 100 parts by mass of the polyamide resin,
to prepare a melt-kneaded product of a polyamide resin composition; and
step (2): injection-molding the melt-kneaded product of a polyamide resin composition obtained in the step (1) in a mold.

BRIEF DESCRIPTION OF THE DRAWINGS

FIG. 1 is a view showing a jig used in the measurement of loss tangent.

DETAILED DESCRIPTION OF THE INVENTION

As resin compositions which can replace various kinds of vibration-damping materials, further improvements in conventional polyamide resin compositions are needed. In other words, the development of a polyamide resin composition capable of not only making damping of vibration faster to improve vibration-damping property, but also making an initial vibrating width of the vibrations smaller is in demand.

The present invention relates to a polyamide resin composition for a vibration-damping material having excellent vibration-damping property even while a flexural modulus is high, and also having excellent impact resistance, and a vibration-damping material containing the polyamide resin composition.

Since the polyamide resin composition of the present invention has a shorter vibration time even while having a high flexural modulus, generated vibrations are damped by using the polyamide resin composition in housing or parts of surroundings of the generation sources for vibrations and sounds in the manufactured article equipment, apparatus, or a building construction that generates vibration or sounds, or placing the material on the generation sources, whereby consequently exhibit some excellent effects of reducing extraneous vibrations related to manufactured articles or apparatus properties, or reducing unpleasant vibrations, sounds or noises.

The polyamide resin composition for a vibration-damping material of the present invention is characterized in that the polyamide resin composition contains
   a polyamide resin,
   a plasticizer in an amount of from 7 to 35 parts by mass, and
   one or more members selected from the group consisting of plate-like fillers and acicular fillers in an amount of from 15 to 80 parts by mass, based on 100 parts by mass of the polyamide resin.
The above polyamide resin composition as used herein may be also described as the polyamide resin composition of the present invention.

In general, when a filler is added to a resin, while the modulus of the overall resin composition is improved, loss tangent thereof would be lowered. This lowering of the loss tangent is caused by reduction in the amount of energy loss in the resin moiety because the proportion of the resin in the resin composition is reduced by addition of the filler. However, in the present invention, since a plate-like filler or an acicular filler is used as a filler, these fillers are oriented in the direction of flow, whereby it is assumed that the frictions generated at interfaces are increased, as compared to other form of fillers, and loss of energy more likely takes place, so that the lowering of loss tangent is suppressed. Also, it is considered that the orientation in a specific direction improves the tensile modulus in the oriented direction and the flexural modulus in an orthogonal direction to the oriented direction.

[Polyamide Resin Composition]
[Polyamide Resin]

The polyamide resin in the present invention is not particularly limited as long as the polyamide resin is a known polyamide resin, and is preferably one of the following (1) to (3):
(1) a copolymer of a polycondensate of a diamine and a dicarboxylic acid;
(2) a polymer of a polycondensate of a lactam or an aminocarboxylic acid; and
(3) a polymer containing two or more members selected from the group consisting of (1) and (2).

As the diamine, an aliphatic diamine, an aromatic diamine, or a diamine having a ring structure can be used. Specific examples include tetramethylenediamine, hexamethylenediamine, octamethylenediamine, nonamethylenediamine, undecamethylenediamine, dodecamethylenediamine, and metaxylylenediamine. These can be used alone or in a combination of two or more kinds. Among them, hexamethylenediamine is preferred from the viewpoint of improving vibration-damping property.

As the dicarboxylic acid, an aliphatic dicarboxylic acid, an aromatic dicarboxylic acid, or a dicarboxylic acid having a ring structure can be used. Specific examples include adipic acid, heptanedicarboxylic acid, octanedicarboxylic acid, nonanedicarboxylic acid, undecanedicarboxylic acid, dodecanedicarboxylic acid, terephthalic acid, and isophthalic acid. These can be used alone or in a combination of two or more kinds. Among them, adipic acid is preferred from the viewpoint of improving vibration-damping property.

As the lactam, a lactam having from 6 to 12 carbon atoms can be used. Specific examples include ε-caprolactam, enanthlactam, undecanelactam, dodecanelactam, α-pyrrolidone, and α-piperidone. These can be used alone or in combination of two or more kinds. Among them, ε-caprolactam, undecanelactam, and dodecanelactam are preferred from the viewpoint of improving vibration-damping property.

As the aminocarboxylic acid, an aminocarboxylic acid having from 6 to 12 carbon atoms can be used. Specific examples include 6-aminocaproic acid, 7-aminoheptanoic acid, 9-aminononanoic acid, 11-aminoundecanoic acid, and 12-aminododecanoic acid. Among them, 6-aminocaproic acid, 11-aminoundecanoic acid, and 12-aminododecanoic acid are preferred from the viewpoint of improving vibration-damping property. These can be used alone or in combination of two or more kinds.

The polycondensation of the above diamine and the above dicarboxylic acid, and the polycondensation of the lactam or the aminocarboxylic acid can be carried out in accordance with a known method, without being particularly limited thereto.

The polyamide resin obtained, when processed as an injection-molded article, an extrusion molded article such as a film or a sheet, or a thermoformed article, has a glass transition temperature (Tg) of preferably 20° C. or higher, more preferably 25° C. or higher, even more preferably 30° C. or higher, and still even more preferably 35° C. or higher, from the viewpoint of giving rigidity capable of supporting its own shape and improving mold processability, and from the viewpoint of improving heat resistance. Also, the polyamide resin has a glass transition temperature of preferably 160° C. or lower, more preferably 150° C. or lower, even more preferably 140° C. or lower, and still even more preferably 130° C. or lower, from the viewpoint of improving vibration-damping property. Here, the glass transition temperatures of the resins and the elastomers as used herein can be measured in accordance with a method described in Examples set forth below.

In addition, it is preferable that a polyamide resin in the present invention has crystallinity. Generally, since there are some differences in elastic moduli between the crystalline portions and the amorphous portions of the resin, a resin matrix comprising only an amorphous portion or a crystalline portion has smaller energy loss to vibration without causing large strains because of its homogenous structure. On the other hand, in a resin matrix comprising a mixture of crystalline portions and amorphous portions, inhomogeneous continuous morphologies having different elastic moduli are formed, so that when vibration is applied, large strains are locally generated in the amorphous portions having lower elastic moduli, whereby consequently generating shearing frictions based on strains to improve energy loss. Accordingly, it is considered that the polyamide resin generally contains larger proportions of amorphous portions, but the polyamide resin has crystallinity in the present invention, so that it is possible to even more improve energy loss of the resin matrix. The method for preparing a polyamide resin having crystallinity includes a method of using a material having a diamine, a dicarboxylic acid, a lactam or an aminocarboxylic acid in high purity; a method of selecting a diamine, a dicarboxylic acid, a lactam or an aminocarboxylic acid having a smaller side chain; and the like. Here, a resin having crystallinity as used herein refers to a resin in which exothermic peaks accompanying crystallization are observed when a resin is heated from 25° C. to 300° C. at a heating rate of 20° C./min, held in that state for 5 minutes, and thereafter cooled to 25° C. or lower at a rate of −20° C./min, as prescribed in JIS K7122 (1999). More specifically, the resin refers to a resin having crystallization enthalpy ΔHmc calculated from areas of exothermic peaks of 1 J/g or more. As the polyamide resin constituting the present invention, it is preferable that a resin having a crystallization enthalpy ΔHmc of preferably 5 J/g or more, more preferably 10 J/g or more, even more preferably 15 J/g or more, and still even more preferably 30 J/g or more is used.

Specific examples of the polyamide resin include a polycaproamide (Polyamide 6), polyhexamethylene adipamide (Polyamide 66), polycaproamide/polyhexamethylene adipamide copolymer (Polyamide 6/66), polytetramethylene adipamide (Polyamide 46), polyhexamethylene sebacamide (Polyamide 610), polyhexamethylene dodecamide (Polyamide 612), polyundecamide (Polyamide 11), polydodecamide (Polyamide 12), polyhexamethylene adipamide/polyhexamethylene terephthalamide copolymer (Polyamide 66/6T), polyhexamethylene adipamide/polyhexamethylene terephthalamide/polyhexamethylene isophthalamide copolymer (Polyamide 66/6T/6I), polyhexamethylene terephthalamide/polyhexamethylene isophthalamide copolymer (Polyamide 6T/6I), polyhexamethylene adipamide/polyhexamethylene isophthalamide copolymer (Polyamide 66/6I), polyhexamethylene adipamide/polyhexamethylene isophthalamide/polycaproamide copolymer (Polyamide 66/6I/6), polyxylene adipamide (Polyamide XD6), and mixtures or copolymers thereof, and the like. These can be used alone or in a combination of two or more kinds. Among them, Polyamide 6, Polyamide 66, Polyamide 11, Polyamide 12, Polyamide 610, Polyamide 612, Polyamide 6/66 copolymer, Polyamide 66/6I copolymer, and Polyamide 66/6I/6 copolymer are preferred, Polyamide 6, Polyamide 66, Polyamide 11, Polyamide 12, Polyamide 610, Polyamide 612, and Polyamide 6/66 are more preferred, and Polyamide 6, Polyamide 66, Polyamide 11, and Polyamide 12 are even more preferred.

The content of the polyamide resin is preferably 30% by mass or more, more preferably 40% by mass or more, even more preferably 50% by mass or more, even more preferably 55% by mass or more, and even more preferably 60% by mass or more, of the polyamide resin composition, from the viewpoint of improving flexural modulus, suppressing the lowering of loss tangent, and having impact resistance. In addition, the content is preferably 90% by mass or less, more preferably 80% by mass or less, even more preferably 75% by mass or less, and even more preferably 70% by mass or less.

[Plasticizer]

The polyamide resin composition of the present invention contains a plasticizer as a vibration-damping material, from the viewpoint of improving loss tangent and impact resistance.

The plasticizer in the present invention is not particularly limited as long as the plasticizer is a plasticizer applicable to the polyamide resin, and an amide-based plasticizer, an ester-based plasticizer, or an amide ester-based plasticizer can be used.

The amide-based plasticizer includes carboxylic acid amide-based plasticizers and sulfonamide-based plasticizers.

The carboxylic acid amide-based plasticizer includes amides of one or more acids selected from the group consisting of benzoic acid, phthalic acid, trimellitic acid, pyromellitic acid and anhydrides thereof, and a dialkylamine of which alkyl group has from 2 to 8 carbon atoms. In addition, the dialkylamine of which alkyl group has from 2 to 8 carbon atoms includes diethylamine, dipropylamine, dibutylamine, dihexylamine, di2-ethylhexylamine, dioctylamine, and the like. The molecular weight of the carboxylic acid amide plasticizer is preferably 250 or more and 2,000 or less, more preferably 300 or more and 1,500 or less, and even more preferably 350 or more and 1,000 or less.

The sulfonamide-based plasticizer includes aromatic sulfonamide-based plasticizers. Specific examples include N-butylbenzenesulfonamide, benzenesulfonamide, p-toluenesulfonamide, o,p-toluenesulfonamide, N-(2-hydroxypropyl)benzenesulfonamide, N-ethyl-o,p-toluenesulfonamide, N-ethyl-p-toluenesulfonamide, and N-methyl-p-toluenesulfonamide. N-Butylbenzenesulfonamide is preferred.

The ester-based plasticizer includes monoester-based plasticizers, diester-based plasticizers, triester-based plasticizers, and polyester-based plasticizers.

The monoester-based plasticizer includes, for example, benzoic acid ester-based plasticizers and stearic acid ester-based plasticizers.

The benzoic acid ester-based plasticizer includes benzoic acid esters of benzoic acid and an aliphatic alcohol having from 6 to 20 carbon atoms or an alkylene oxide adduct (the number of moles of alkylene oxide added being 10 mol or less) of which alkylene oxide has from 2 to 4 carbon atoms of the aliphatic alcohol. Specific examples thereof include 2-ethylhexyl p-oxybenzoate and 2-hexyldecyl p-oxybenzoate. The stearic acid ester-based plasticizer includes stearic acid esters of stearic acid and an aliphatic alcohol having from 1 to 18 carbon atoms or an alkylene oxide adduct (the number of moles of alkylene oxide added being 10 mol or less), of which alkylene oxide has from 2 to 4 carbon atoms, of the aliphatic alcohol. Specific examples thereof include methyl stearate, ethyl stearate, butyl stearate, and hexyl stearate.

The diester-based plasticizer includes diester-based plasticizers of one or more acids selected from the group consisting of phthalic acid, terephthalic acid, adipic acid, maleic acid, azelaic acid, sebacic acid, and anhydrides thereof, and one or more alcohols selected from the group consisting of aliphatic alcohols, alicyclic alcohols, and aromatic alcohols. Specific examples include butylbenzyl phthalate, dilauryl phthalate, diheptyl phthalate, dibutyl phthalate, dimethyl phthalate, dicyclohexyl phthalate, diethyl phthalate, diisodecyl phthalate, dioctyl phthalate, dioctyl adipate, diisodecyl adipate, di(butoxyethyl) adipate, di-2-ethylhexyl azelate, di-2-ethylhexyl maleate, dibutyl maleate, dioctyl sebacate, and dibutyl sebacate.

The triester-based plasticizer includes triester-based plasticizers of one or more acids selected from the group consisting of citric acid, trimellitic acid, phosphoric acid, and anhydrides thereof, and one or more alcohols selected from the group consisting of aliphatic alcohols, alicyclic alcohols, and aromatic alcohols. Specific examples include citric acid triesters such as triethyl citrate, tributyl citrate, and 2-ethylhexyl citrate; trimellitic acid triesters such as tributyl trimellitate, trioctyl trimellitate, and tris(2-ethylhexyl) trimellitate; and phosphoric acid triesters such as tricresyl phosphate, tris(isopropylphenyl) phosphate, tributyl phosphate, triethyl phosphate, trioctyl phosphate, tris(β-chloroethyl) phosphate, tris(dichloropropyl) phosphate, tris(butoxyethyl) phosphate, tris(β-chloropropyl) phosphate, triphenyl phosphate, and octyldiphenyl phosphate.

The polyester-based plasticizer is a plasticizer having four or more ester groups, and includes pyromellitic acid-based compounds, and citric acid acetyltrialkyl-based compounds.

The amide ester-based plasticizer includes amide ester of one or more acids selected from the group consisting of phthalic acid, trimellitic acid, pyromellitic acid and anhydrides thereof, a dialkylamine of which alkyl group has from 2 to 8 carbon atoms, and an aliphatic alcohol having from 2 to 8 carbon atoms or an alkylene oxide adduct (the number of moles of alkylene oxide added being 10 mol or less) of which alkylene oxide has from 2 to 4 carbon atoms of the aliphatic alcohol. In addition, the dialkylamine of which alkyl group has from 2 to 8 carbon atoms includes diethylamine, dipropylamine, dibutylamine, dihexylamine, di2-ethylhexylamine, dioctylamine, and the like. In addition, the aliphatic alcohol having from 6 to 20 carbon atoms includes n-hexanol, 2-ethylhexanol, n-octanol, i-nonyl alcohol, decanol, lauryl alcohol, cetyl alcohol, i-tridecanol, hexyldecanol, oleyl alcohol, octyldodecanol, and the like. In addition, the alkylene oxide adduct of which alkylene oxide has from 2 to 4 carbon atoms of the aliphatic alcohol having from 6 to 20 carbon atoms includes adducts of one or more members of ethylene oxide, propylene oxide, and butylene oxide of the above aliphatic alcohol having from 6 to 20 carbon atoms. The number of moles of the alkylene oxide added is preferably 10 mol or less, and more preferably 5 mol or less, based on 1 mol of the alcohol. The molecular weight of the amide ester-based plasticizer is preferably 250 or more and 2,000 or less, more preferably 300 or more and 1,500 or less, and even more preferably 350 or more and 1,000 or less.

In addition, besides the above plasticizer, an epoxy-based plasticizer, a plasticizer for rubber, a paraffin chloride, a polyhydric alcohol and a derivative thereof, an alcohol, a caprolactam, an oligoamide, a metal halide and the like can be used.

The content of one or more members selected from the group consisting of amide-based plasticizers, ester-based plasticizers, and amide ester-based plasticizers is preferably 50% by mass or more, more preferably 80% by mass or more, even more preferably 90% by mass or more, even more preferably 95% by mass or more, even more preferably substantially 100% by mass, and even more preferably 100% by mass, of the plasticizer, from the viewpoint of improving loss tangent as a vibration-damping material. Substantially 100% by mass, as used herein, refers to a case where the trace amounts of impurities are unavoidably included. In addition, the above-mentioned content of the plasticizer as used herein means a total content when plural compounds are contained.

The content of the plasticizer, based on 100 parts by mass of the polyamide resin, may be 7 part by mass or more and 35 parts by mass or less. The content is preferably 10 parts by mass or more, and more preferably 15 parts by mass or more, from the viewpoint of improving impact resistance and loss tangent, and the content is preferably 30 parts by mass or less, more preferably 25 parts by mass or less, even more preferably 20 parts by mass or less, and even more preferably 18 parts by mass or less, from the viewpoint of improving flexural modulus.

In addition, the content of the plasticizer in the polyamide resin composition is preferably 5% by mass or more, more preferably 8% by mass or more, even more preferably 9% by mass or more, and even more preferably 10% by mass or more, from the viewpoint of improving impact resistance and loss tangent, and the content is preferably 30% by mass or less, more preferably 20% by mass or less, and even more preferably 15% by mass or less, from the viewpoint of improving flexural modulus.

[Filler]

The polyamide resin composition of the present invention contains a filler, from the viewpoint of improving flexural modulus. As the filler in the present invention, one or more members selected from the group consisting of plate-like fillers, and acicular fillers that are ordinarily usable in the reinforcement of thermoplastic resins are used.

The plate-like fillers refer to those having an aspect ratio (length of the longest side of the largest surface of the plate-like filler/thickness of the surface) of 2 or more and 150 or less, and a ratio of a length to a breadth of a cross section approximately orthogonal to an axis extending in a longitudinal direction (cross-sectional ratio of length to breadth) calculated by the following formula of 2 or more and less than 150.

Cross-sectional ratio of length to breadth=largest length to smallest breadth in a cross section approximately orthogonal to an axis extending in a longitudinal direction The length of the plate-like filler (length of the longest side in the largest surface) is preferably 1.0 μm or more, more preferably 2 μm or more, and even more preferably 3 μm or more, and preferably 150 μm or less, more preferably 100 μm or less, even more preferably 50 μm or less, even more preferably 30 μm or less, and even more preferably 15 μm or less, from the viewpoint of obtaining excellent dispersibility in the polyamide resin composition, improving flexural modulus, and suppressing the lowering of loss tangent. The thickness is, but not particularly limited to, preferably 0.01 μm or more, more preferably 0.05 μM or more, and even more preferably 0.1 μm or more, and preferably 5 μm or less, more preferably 3 μm or less, even more preferably 1 μm or less, even more preferably 0.5 μm or less, and even more preferably 0.3 μm or less, from the same viewpoint. In addition, the aspect ratio of the plate-like filler is preferably 5 or more, more preferably 10 or more, and even more preferably 20 or more, and preferably 120 or less, more preferably 90 or less, even more preferably 70 or less, and even more preferably 50 or less, from the same viewpoint. In addition, the cross-sectional ratio of length to breadth of the plate-like filler is preferably 3 or more, and more preferably 5 or more, and preferably 50 or less, more preferably 30 or less, even more preferably 20 or less, even more preferably 10 or less, and even more preferably 8 or less. Specific examples of the plate-like filler include, for example, glass flake, non-swellable mica, swellable mica, graphite, metal foil, talc, clay, mica, sericite, zeolite, bentonite, organic modified bentonite, montmorillonite, organic modified montmorillonite, dolomite, smectite, hydrotalcite, plate-like iron oxide, plate-like calcium carbonate, plate-like magnesium hydroxide, plate-like barium sulfate, and the like. Among them, talc, mica, or plate-like barium sulfate is preferred, talc or mica is more preferred, and talc is even more preferred, from the viewpoint of improving flexural modulus and suppressing the lowering of loss tangent. Here, the length and the thickness of the plate-like filler can be obtained by observing randomly chosen 100 fillers with an optical microscope, and calculating an arithmetic mean thereof.

The acicular filler refers to those having an aspect ratio (particle length/particle size) within the range of 2 or more and 150 or less, and the filler has a ratio of length to breadth in a cross section (cross-sectional ratio of length to breadth) calculated by the above formula of 1 or more and less than 2. The length of the acicular filler (particle length) is preferably 1.0 μm or more, more preferably 5 μm or more, even more preferably 10 μm or more, even more preferably 20 μm or more, and even more preferably 30 μm or more, and preferably 150 μm or less, more preferably 100 μM or less, even more preferably 80 μm or less, and even more preferably 60 μm or less, from the viewpoint of obtaining excellent dispersibility in the polyamide resin composition, improving flexural modulus, and suppressing the lowering of loss tangent. The particle size is, but not particularly limited to, preferably 0.01 μm or more, more preferably 0.1 μm or more, and even more preferably 0.5 μm or more, and preferably 20 μm or less, more preferably 15 μm or less, and even more preferably 10 μm or less, from the same viewpoint. In addition, the aspect ratio of the acicular filler is preferably 3 or more, and more preferably 5 or more, and preferably 120 or less, more preferably 90 or less, even more preferably 70 or less, even more preferably 50 or less, even more preferably 30 or less, even more preferably 20 or less, and even more preferably 10 or less, from the same viewpoint. In addition, the cross-sectional ratio of length to breadth of the acicular filler is preferably 1.2 or more, and more preferably 1.5 or more, and preferably 1.8 or less. Specific examples of the acicular filler include, for example, potassium titanate whiskers, aluminum borate whiskers, magnesium-based whiskers, silicon-based whiskers, wollastonite, sepiolite, asbestos, zonolite, phosphate fibers, ellestadite, slag fibers, gypsum fibers, silica fibers, silica alumina fibers, zirconia fibers, boron nitride fibers, silicon nitride fibers, boron fibers, and the like. Among them, potassium titanate whiskers and wollastonite are preferred. Here, the particle length and the particle size of the acicular filler can be obtained by observing 100 randomly chosen fillers with an optical microscope, and calculating an arithmetic mean thereof. In a case where the particle size has a length and a breadth, the average particle size is calculated using the length.

These plate-like fillers and acicular fillers can be used alone or in a combination of two or more kinds, and the shapes at the time of combining are not particularly limited. The content of one or more members selected from the group consisting of plate-like fillers and acicular fillers may be, based on 100 parts by mass of the polyamide resin, 15 parts by mass or more and 80 parts by mass or less, and is preferably 20 parts by mass or more, more preferably 25 parts by mass or more, and even more preferably 30 parts by mass or more, from the viewpoint of improving flexural modulus, and preferably 60 parts by mass or less, and more preferably 50 parts by mass or less, from the viewpoint of suppressing the lowering of loss tangent. In addition, the content of one or more members selected from plate-like fillers and acicular fillers in the fillers used in the present invention is preferably 50% by mass or more, more preferably 70% by mass or more, even more preferably 80% by mass or more, even more preferably 90% by mass or more, even more preferably 95% by mass or more, even more preferably substantially 100% by mass, and even more preferably 100% by mass, from the viewpoint of suppressing the lowering of loss tangent. Here, substantially 100% by mass, as used herein, refers to a case where impurities and the like are inevitably included. In addition, the content of the fillers as used herein means a total content when plural compounds are contained.

In addition, in the present invention, fillers other than plate-like fillers and acicular fillers can be used, within the range that would not impair the effects of the present invention. Specific examples include fibrous fillers and granular fillers that are ordinarily usable in the reinforcement of thermoplastic resins, and among them, fibrous fillers are preferred.

The fibrous filler refers to those having an aspect ratio (average fiber length/average fiber diameter) of exceeding 150. The length of the fibrous filler (average fiber length) is preferably 0.15 mm or more, more preferably 0.2 mm or more, even more preferably 0.5 mm or more, and even more preferably 1 mm or more, and preferably 30 mm or less, more preferably 10 mm or less, and even more preferably 5 mm or less, from the viewpoint of improving flexural modulus and suppressing the lowering of loss tangent. The average fiber diameter is, but not particularly limited thereto, preferably 1 μm or more, more preferably 3 μm or more, even more preferably 5 μm or more, and even more preferably 10 μm or more, and preferably 30 μm or less, more preferably 25 μm or less, and even more preferably 20 μM or less, from the same viewpoint. In addition, the aspect ratio is preferably 160 or more, more preferably 180 or more, and even more preferably 200 or more, and preferably 10,000 or less, more preferably 5,000 or less, even more preferably 1,000 or less, even more preferably 800 or less, even more preferably 500 or less, and even more preferably 300 or less, from the same viewpoint. Specific examples of the fibrous filler include, for example, glass fibers, carbon fibers, graphite fibers, metal fibers, cellulose fibers, and the like. Among them, carbon fibers and glass fibers are preferred, and glass fibers are more preferred, from the same viewpoint. Here, the fiber length and the fiber diameter of the fibrous filler can be obtained by observing 100 randomly chosen fillers with an optical microscope, and calculating an arithmetic mean thereof. In a case where the fiber diameter has a length and a breadth, the average particle size is calculated using the length. In addition, as the fibrous filler, not only those that are in a circular form where a length and a breadth are the same, but also those having different length and breadth such as an elliptic form (for example, length/breadth=4) or an eyebrow form (for example, length/breadth=2) may be used. On the other hand, when a resin and a fibrous filler are melt-kneaded in order to prepare a resin composition using a kneader such as a twin-screw extruder, although the fibrous filler is cut with a shearing force in the kneading portion to shorten the average fiber length, the average fiber length of the fibrous filler in the resin is preferably from 100 to 800 μm, more preferably from 200 to 700 μm, and even more preferably from 300 to 600 μm, from the same viewpoint.

The above fibrous fillers can be used alone or in a combination of two or more kinds. The content of the fibrous filler is, based on 100 parts by mass of the polyamide resin, preferably 1 part by mass or more, and more preferably 3 parts by mass or more, and preferably 20 parts by mass or less, more preferably 10 parts by mass or less, and even more preferably 7 parts by mass or less, from the viewpoint of improving flexural modulus of the resin composition, and at the same time suppressing the lowering of loss tangent and the lowering of impact resistance. In addition, the content of the fibrous filler in the filler usable in the present invention is preferably 3% by mass or more, more preferably 5% by mass or more, and even more preferably 10% by mass or more, and preferably 30% by mass or less, more preferably 20% by mass or less, and even more preferably 15% by mass or less, from the viewpoint of improving flexural modulus, and at the same time suppressing the lowering of loss tangent and the lowering of impact resistance.

In the present invention, the mass ratio of one or more fillers selected from the group consisting of plate-like fillers and acicular fillers to the fibrous filler [(plate-like filler+acicular filler)/fibrous filler] is preferably from 70/30 to 95/5, more preferably from 80/20 to 90/10, and even more preferably from 85/15 to 90/10, from the viewpoint of improving flexural modulus and suppressing the lowering of loss tangent and the lowering of impact resistance.

The granular fillers include not only those showing the true spherical form but also those that are cross-sectional elliptic or nearly elliptic, and have an aspect ratio (longest diameter of the granular filler/shortest diameter of the granular filler) is 1 or more and less than 2, and one having an aspect ratio of nearly 1 is preferred. The average particle size of the granular filler is preferably 1.0 µm or more, more preferably 5 µm or more, even more preferably 10 µm or more, and even more preferably 20 µm or more, and preferably 50 µm or less, more preferably 40 µm or less, and even more preferably 30 µm or less, from the viewpoint of obtaining excellent dispersibility in the polyamide resin composition, improving flexural modulus, and suppressing the lowering of loss tangent. Specific examples include kaolin, fine silicic acid powder, feldspar powder, granular calcium carbonate, granular magnesium hydroxide, granular barium sulfate, aluminum hydroxide, magnesium carbonate, calcium oxide, aluminum oxide, magnesium oxide, titanium oxide, aluminum silicate, various balloons, various beads, silicon oxide, gypsum, novaculite, dawsonite, white clay, and the like. Among them, granular barium sulfate, aluminum hydroxide, and granular calcium carbonate are preferred, and granular calcium carbonate and granular barium sulfate are more preferred, from the viewpoint of flexural modulus. Here, the diameter of the granular filler can be obtained by cutting 100 randomly chosen fillers, observing the cross sections with an optical microscope, and calculating an arithmetic mean thereof.

The above granular filler can be used in alone or in a combination of two or more kinds. The content of the granular filler is, based on 100 parts by mass of the polyamide resin, preferably 3 parts by mass or more, and more preferably 4 parts by mass or more, and preferably 50 parts by mass or less, more preferably 30 parts by mass or less, even more preferably 15 parts by mass or less, even more preferably 10 parts by mass or less, and even more preferably 6 parts by mass or less, from the viewpoint of improving flexural modulus of the resin composition, and at the same time suppressing the lowering of loss tangent and the lowering of impact resistance.

Here, in the present invention, the above plate-like, granular, or acicular filler may be subjected to a coating or binding treatment with a thermoplastic resin such as an ethylene/vinyl acetate copolymer, or with a thermosetting resin such as an epoxy resin, or the filler may be treated with a coupling agent such as amino silane or epoxy silane.

The filler in the present invention may contain one or more members selected from the group consisting of plate-like fillers and acicular fillers. Among them, from the viewpoint of improving flexural modulus and suppressing the lowering of loss tangent, it is preferable that one or more members selected from the group consisting of plate-like fillers and acicular fillers are used in combination with one or more members selected from the group consisting of granular fillers and fibrous fillers, and it is more preferable that one or more members selected from the group consisting of plate-like fillers and acicular fillers are used in combination with one or more members of fibrous fillers. Specifically, mica and/or talc and glass fibers are preferably used, and talc and glass fiber are more preferably used.

In the present invention, one or more members selected from the group consisting of plate-like fillers and acicular fillers may be used in an amount of from 15 to 80 parts by mass. A total content of fillers used is, based on 100 parts by mass of the polyamide resin, preferably 20 parts by mass or more, more preferably 25 parts by mass or more, even more preferably 30 parts by mass or more, and even more preferably 35 parts by mass or more, from the viewpoint of improving flexural modulus, and preferably 55 parts by mass or less, and more preferably 50 parts by mass or less, from the viewpoint of suppressing the lowering of loss tangent.

In addition, a total content of the fillers used in the polyamide resin composition is preferably 10% by mass or more, more preferably 15% by mass or more, and even more preferably 20% by mass or more, from the viewpoint of improving impact resistance and flexural modulus, and preferably 45% by mass or less, more preferably 40% by mass or less, even more preferably 35% by mass or less, and even more preferably 30% by mass or less, from the viewpoint of suppressing the lowering of loss tangent.

In the present invention, the mass ratio of the plasticizer to one or more fillers selected from the group consisting of plate-like fillers and acicular fillers [plasticizer/(plate-like filler+acicular filler)] is preferably from 0.15 to 0.8, more preferably from 0.25 to 0.6, and even more preferably from 0.3 to 0.4, from the viewpoint of improving flexural modulus and suppressing the lowering of loss tangent.

[Organic Crystal Nucleating Agent]

In addition, the polyamide resin composition of the present invention can contain an organic crystal nucleating agent, from the viewpoint of improving crystallization velocity of the polyamide resin, improving crystallinity of the polyamide resin, and improving flexural modulus.

As the organic crystal nucleating agent, known organic crystal nucleating agents can be used, and organic metal salts of carboxylic acids, organic sulfonates, carboxylic acid amides, metal salts of phosphorus-containing compounds, metal salts of rosins, alkoxy metal salts, and the like can be used. Specifically, for example, the organic metal salts of carboxylic acids include sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanate, potassium octacosanate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, and sodium cyclohexanecarboxylate. The organic sulfonates include sodium p-toluenesulfonate and sodium sulfoisophthalate. The carboxylic acid amides include stearamide, ethylenebis (lauric acid amide), palmitic acid amide, hydroxystearamide, erucic acid amide, trimesic acid tris(t-butylamide). The metal salts of phosphorus-containing compounds include sodium-2,2'-methylenebis(4,6-di-t-butylphenyl) phosphate. The metal salts of rosins include sodium dehydroabietate and sodium dihydroabietate. The alkoxy metal salts include sodium 2,2-methylbis(4,6-di-t-butylphenyl). Other organic crystal nucleating agents include benzylidene sorbitol and derivatives thereof.

The content of the organic crystal nucleating agent is, based on 100 parts by mass of the polyamide resin, preferably 0.01 parts by mass or more, more preferably 0.1 parts by mass or more, and even more preferably 0.5 parts by mass or more, from the viewpoint of improving impact resistance, flexural modulus and loss tangent, and the content is preferably 30 parts by mass or less, more preferably 20 parts by mass or less, even more preferably 10 parts by mass or less, even more preferably 5 parts by mass or less, and even more preferably 3 parts by mass or less, from the viewpoint of improving impact resistance, flexural modulus and loss tangent. Here, in the present specification, the content of the organic crystal nucleating agent means a total content of all the organic crystal nucleating agents contained in the polyamide resin composition.

[Styrene-Isoprene Block Copolymer]

The polyamide resin composition of the present invention can contain a styrene-isoprene block copolymer as a component other than the above components, within the range that would not impair the effects of the present invention.

The styrene-isoprene block copolymer in the present invention is a block copolymer that has a polystyrene block at both the terminals, and at least one of the blocks of polyisoprene block or vinyl-polyisoprene block. In addition, the block copolymer may be copolymerized with an isoprene block or butadiene block, or may have a hydrogenated structure.

Specific examples of the styrene-isoprene block copolymer mentioned above include, for example, polystyrene-isoprene block copolymers (SIS), polystyrene-hydrogenated polyisoprene-polystyrene block copolymers (SEPS), polystyrene-vinyl-polyisoprene-polystyrene block copolymers (SHIVS), polystyrene-hydrogenated polybutadiene-hydrogenated polyisoprene-polystyrene block copolymers, polystyrene-hydrogenated polybutadiene-polyisoprene-polystyrene block copolymers, and the like. These copolymers can be used alone, or in a combination of two or more kinds. In the present invention, among them, it is preferable to use the polystyrene-vinyl-polyisoprene-polystyrene block copolymers, and a commercially available product of the block copolymer as mentioned above includes "HYBRAR" Series, manufactured by Kuraray Plastics Co., Ltd.

The styrene content is preferably 10% by mass or more, and more preferably 15% by mass or more, and preferably 30% by mass or less, and more preferably 25% by mass or less, of the styrene-isoprene block copolymer, from the viewpoint of improving vibration-damping properties at high-temperature ranges and low-temperature ranges. Here, the high-temperature ranges, as used herein, mean a temperature of from 35° to 80° C., and the low-temperature ranges mean a temperature of from −20° to 10° C., and the styrene content in the copolymer can be measured in accordance with a method described in Examples set forth below.

In addition, the styrene-isoprene block copolymer has a glass transition temperature Tg of preferably −40° C. or higher, and preferably 20° C. or lower, from the viewpoint of improving vibration-damping properties at high-temperature ranges and low-temperature ranges.

The content of the styrene-isoprene block copolymer is, based on 100 parts by mass of the polyamide resin, preferably 3 parts by mass or more, more preferably 5 parts by mass or more, even more preferably 10 parts by mass or more, and even more preferably 13 parts by mass or more, from the viewpoint of improving loss tangent at low-temperature ranges. In addition, the content is preferably 40 parts by mass or less, more preferably 30 parts by mass or less, and even more preferably 20 parts by mass or less, from the viewpoint of suppressing the lowering of flexural modulus.

In addition, the content of the styrene-isoprene block copolymer in the polyamide resin composition is preferably 3% by mass or more, and more preferably 5% by mass or more, from the viewpoint of improving loss tangent, and the content is preferably 25% by mass or less, more preferably 20% by mass or less, and even more preferably 15% by mass or less, from the viewpoint of suppressing the lowering of flexural modulus.

The polyamide resin composition of the present invention can contain, as a component other than the components mentioned above, an inorganic crystal nucleating agent, a hydrolysis inhibitor, a flame retardant, an antioxidant, a lubricant such as a hydrocarbon-based wax or an anionic surfactant, an ultraviolet absorbent, an antistatic agent, an anti-clouding agent, a photostabilizer, a pigment, a mildewproof agent, a bactericidal agent, a blowing agent, or the like, within the range that would not impair the effects of the present invention. In addition, other polymeric materials and other resin compositions can be contained within the range that would not inhibit the effects of the present invention.

The polyamide resin composition of the present invention can be prepared without any particular limitations, so long as the composition contains a polyamide resin, a plasticizer in an amount of from 7 to 35 parts by mass, and one or more fillers selected from plate-like fillers and acicular fillers in an amount of from 15 to 80 parts by mass, based on 100 parts by mass of the polyamide resin. For example, the polyamide resin composition can be prepared by melt-kneading raw materials containing a polyamide resin, a plasticizer, and the above-mentioned filler, and further optionally various additives with a known kneader such as a closed kneader, a single-screw or twin-screw extruder, or an open roller-type kneader. After melt-kneading, the melt-kneaded product may be dried or cooled in accordance with a known method. The raw materials can also be subjected to melt-kneading after homogeneously mixing the raw materials with a Henschel mixer, a super mixer or the like in advance, or melt-kneading may be carried out by previously immersing the plasticizer into the polyamide resin, and thereafter adding the remaining raw materials thereto. Here, the melt-blending may be carried out in the presence of a supercritical gas in order to accelerate plasticity of the polyamide resin when the raw materials are melt-blended.

The melt-kneading temperature cannot be unconditionally determined because the melt-kneading temperature depends upon the kinds of the polyamide resin used, and the melt-kneading temperature is preferably 220° C. or higher, more preferably 225° C. or higher, and even more preferably 230° C. or higher, and preferably 300° C. or lower, more preferably 290° C. or lower, even more preferably 280° C. or lower, even more preferably 260° C. or lower, even more preferably 250° C. or lower, and even more preferably 240° C. or lower, from the viewpoint of improving moldability and prevention of deterioration of the polyamide resin composition. The melt-kneading time cannot be unconditionally determined because the melt-kneading time depends upon a melt-kneading temperature and the kinds of a kneader, and the melt-kneading time is preferably from 15 to 900 seconds.

The kneaded product thus obtained has excellent vibration-damping property even though flexural modulus is high, and has excellent impact resistance, so that the kneaded product can be suitably used as manufactured articles such as audio equipment, electric appliances, construction buildings, and industrial equipment, or parts or housing thereof, by using various mold-processing methods such as injection molding, extrusion molding or thermoforming. In addition, since the polyamide resin composition of the present invention has a high flexural modulus even with a single material, the polyamide resin composition has an excellent vibration-damping property of being capable of sufficiently keeping the shape with a single material without having to use a high-rigidity material such as a metal steel plate, so that the polyamide resin composition can be preferably used in manufactured articles that are required to be light-weighted of transportation vehicles such as automobiles, railcars, and airplanes, or parts or housings thereof.

In other words, in the present invention, a polyamide resin composition containing a polyamide resin, a plasticizer in an amount of from 7 to 35 parts by mass, and a filler containing one or more members selected from plate-like fillers and acicular fillers in an amount of from 15 to 80 parts by mass, based on 100 parts by mass of the polyamide resin can be used as a vibration-damping material.

The application of the polyamide resin composition of the present invention to manufactured articles such as audio equipment, electric appliances, transportation vehicles, construction buildings, and industrial equipment, or parts or housing thereof can be appropriately set according to the methods for producing the parts, housings, apparatuses and equipment, applied parts, and intended purposes, and the polyamide resin composition can be used in accordance with a conventional method in the art. In other words, the manufactured articles such as audio equipment, electric appliances, transportation vehicles, construction buildings, and industrial equipment, or parts or housing thereof can be obtained by molding the polyamide resin composition of the present invention in accordance with a known method.

Specifically, for example, when a part or housing containing the polyamide resin composition of the present invention is produced by injection molding, the part or housing is obtained by filling pellets of the above polyamide resin composition in an injection-molding machine, and injecting the molten pellets in a mold to mold.

In the injection molding, a known injection-molding machine can be used, including, for example, a machine comprising a cylinder and a screw inserted through an internal thereof as main constituting elements, e.g. J75E-D, J110AD-180H manufactured by The Japan Steel Works, Ltd. or the like. Here, although the raw materials for the above-mentioned polyamide resin composition may be supplied to a cylinder and directly melt-kneaded, it is preferable that a product previously melt-kneaded is filled in an injection-molding machine.

The set temperature of the cylinder is preferably 220° C. or higher, and more preferably 235° C. or higher, and the set temperature is preferably 290° C. or lower, more preferably 280° C. or lower, even more preferably 260° C. or lower, and even more preferably 255° C. or lower. When the melt-kneader is used, the set temperature means a set temperature of the cylinder of the kneader during melt-kneading. Here, the cylinder comprises some heaters, by which temperature control is carried out. The number of heaters cannot be unconditionally determined because the number depends on the kinds of machines, and it is preferable that the heaters controlled to the above-mentioned set temperature are present at least at the discharge outlet side of the melt-kneaded product, i.e. the side of tip end of nozzle.

The mold temperature is preferably 150° C. or lower, more preferably 140° C. or lower, and even more preferably 130° C. or lower, from the viewpoint of improving the crystallization velocity of the polyamide resin composition and improving operability. Also, the mold temperature is preferably 20° C. or higher, more preferably 30° C. or higher, and even more preferably 40° C. or higher. The holding time inside the mold cannot be unconditionally determined because the holding time depends upon the temperature of the mold. The holding time is preferably from 5 to 100 seconds, from the viewpoint of improving productivity of the molded article.

The polyamide resin composition of the present invention can be used for speakers, television, radio cassette players, headphones, audio components, microphones, etc. as materials for audio equipment housings; further electromotive tools such as electromotive drills and electromotive drivers, electric appliances with cooling fans such as computers, projectors, servers, and POS systems, washing machines, clothes dryers, air-conditioned indoor units, sewing machines, dishwashers, fan heaters, multifunctional photocopier machines, printers, scanners, hard disk drives, video cameras, etc. as materials for parts and housings of electric appliances with electromotive motors; electromotive toothbrushes, electromotive shavers, massaging machines, etc. as materials for parts and housings of vibrated source-containing electric appliances; generators, gas generators, etc. as materials for parts and housings of electric appliances with motors; refrigerators, automatic vending machines, air-conditioned external machines, dehumidifiers, and domestic generators as materials for parts and housings of electric appliances with compressors; materials for interior materials such as dashboards, instrumental panels, floor, doors, and roofs, and engine-related materials such as oil pans, front cover, and locker cover, etc. as materials for automobile parts; interior materials such as floor, walls, side plates, ceiling, doors, chairs, and tables, housings or parts of motor-related area, various protective covers, etc. as materials for railcar parts; interior materials such as floor, walls, side plates, ceiling, chairs, and tables, housings or parts in the engine-related parts etc. as materials for airplane parts; housings or wall materials for engine room, housings or wall materials for instrumental measurement room, as materials for ship parts; walls, ceiling, floor, partition boards, soundproof walls, shutters, curtain rails, pipe ducts, staircases, doors, etc. as materials for construction; shooters, elevators (lifts), escalators, conveyors, tractors, bulldozers, lawn mowers, etc. as materials for industrial equipment parts.

The present invention also provides a method for producing parts or housing containing a polyamide resin composition of the present invention.

The production method is not particularly limited, so long as the method includes the step of molding a polyamide resin composition of the present invention in accordance with a known method, and includes, for example, a method including the step of injection-molding a polyamide resin composition of the present invention. Steps can appropriately be added in accordance with the kinds of the molded articles obtained.

Specifically, the method includes an embodiment including the following steps:

step (1): melt-kneading a polyamide resin composition containing a polyamide resin, a plasticizer in an amount of from 7 to 35 parts by mass, and one or more members selected from plate-like fillers and acicular fillers in an amount of from 15 to 80 parts by mass, based on 100 parts by mass of the polyamide resin, to prepare a melt-kneaded product of the polyamide resin composition; and step (2): injection-molding the melt-kneaded product of the polyamide resin composition obtained in the step (1) in a mold.

The step (1) is the step to prepare a melt-kneaded product of the polyamide resin composition. Specifically, the melt-kneaded product can be prepared by melt-kneading raw materials containing a polyamide resin, a plasticizer in an amount of from 7 to 35 parts by mass, and one or more members selected from plate-like fillers and acicular fillers in an amount of from 15 to 80 parts by mass, and optionally various additives, based on 100 parts by mass of the polyamide resin, at a temperature of preferably 220° C. or higher, more preferably 225° C. or higher, and even more preferably 230° C. or higher, and preferably 300° C. or lower, more preferably 290° C. or lower, even more preferably 280° C.

or lower, even more preferably 260° C. or lower, even more preferably 250° C. or lower, and even more preferably 240° C. or lower.

The step (2) is the step of injection-molding the melt-kneaded product of the polyamide resin composition. Specifically, the melt-kneaded product obtained in the step (1) can be molded by filling the melt-kneaded product in an injection-molding machine equipped with a cylinder heated to a temperature of preferably 220° C. or higher, and more preferably 225° C. or higher, and preferably 290° C. or lower, more preferably 280° C. or lower, even more preferably 260° C. or lower, and even more preferably 255° C. or lower, and injecting in a mold at a temperature of preferably 150° C. or lower, more preferably 140° C. or lower, and even more preferably 130° C. or lower, and preferably 20° C. or higher, more preferably 30° C. or higher, and even more preferably 40° C. or higher.

The injection-molded article of the present invention thus obtained can be suitably used as parts or housings containing a vibration-damping material.

In addition, with respect to the above-mentioned embodiments, the present invention further discloses the following polyamide resin compositions, and use thereof.

<1> A polyamide resin composition for a vibration-damping material containing
a polyamide resin,
a plasticizer in an amount of from 7 to 35 parts by mass, and
one or more members selected from the group consisting of plate-like fillers and acicular fillers in an amount of from 15 to 80 parts by mass, based on 100 parts by mass of the polyamide resin.

<2> The polyamide resin composition according to the above <1>, wherein the polyamide resin is preferably the following (1) to (3):
(1) a copolymer of a polycondensate of a diamine and a dicarboxylic acid;
(2) a polymer of a polycondensate of a lactam or an aminocarboxylic acid; and
(3) a polymer containing two or more members selected from the group consisting of (1) and (2).

<3> The polyamide resin composition according to the above <2>, wherein as the diamine, an aliphatic diamine, an aromatic diamine, or a diamine having a ring structure is preferably used, tetramethylenediamine, hexamethylenediamine, octamethylenediamine, nonamethylenediamine, undecamethylenediamine, dodecamethylenediamine, or metaxylylenediamine is more preferred, and hexamethylenediamine is even more preferred.

<4> The polyamide resin composition according to the above <2>, wherein as the dicarboxylic acid, an aliphatic dicarboxylic acid, an aromatic dicarboxylic acid, or a dicarboxylic acid having a ring structure is preferred, adipic acid, heptanedicarboxylic acid, octanedicarboxylic acid, nonanedicarboxylic acid, undecanedicarboxylic acid, dodecanedicarboxylic acid, terephthalic acid, or isophthalic acid is more preferred, and adipic acid is even more preferred.

<5> The polyamide resin composition according to the above <2>, wherein as the lactam, a lactam having from 6 to 12 carbon atoms is preferred, ε-caprolactam, enanthlactam, undecanelactam, dodecanelactam, α-pyrrolidone, or α-piperidone is more preferred, and ε-caprolactam, undecanelactam, or dodecanelactam is even more preferred.

<6> The polyamide resin composition according to the above <2>, wherein as the aminocarboxylic acid, an aminocarboxylic acid having from 6 to 12 carbon atoms is preferred, 6-aminocaproic acid, 7-aminoheptanoic acid, 9-aminononanoic acid, 11-aminoundecanoic acid, or 12-aminododecanoic acid is more preferred, and 6-aminocaproic acid, 11-aminoundecanoic acid, or 12-aminododecanoic acid is even more preferred.

<7> The polyamide resin composition according to any one of the above <1> to <6>, wherein the polyamide resin has a glass transition temperature (Tg) of preferably 20° C. or higher, more preferably 25° C. or higher, even more preferably 30° C. or higher, and still even more preferably 35° C. or higher, and preferably 160° C. or lower, more preferably 150° C. or lower, even more preferably 140° C. or lower, and still even more preferably 130° C. or lower.

<8> The polyamide resin composition according to any one of the above <1> to <7>, wherein when the polyamide resin is heated from 25° C. to 300° C. at a heating rate of 20° C./min, held in that state for 5 minutes, and thereafter cooled to 25° C. or lower at a rate of −20° C./min, crystallization enthalpy ΔHmc calculated from areas of exothermic peaks accompanying crystallization is preferably 5 J/g or more, more preferably 10 J/g or more, even more preferably 15 J/g or more, and even more preferably 30 J/g or more.

<9> The polyamide resin composition according to any one of the above <1> to <8>, wherein as the polyamide resin, polycaproamide (Polyamide 6), polyhexamethylene adipamide (Polyamide 66), polycaproamide/polyhexamethylene adipamide copolymer (Polyamide 6/66), polytetramethylene adipamide (Polyamide 46), polyhexamethylene sebacamide (Polyamide 610), polyhexamethylene dodecamide (Polyamide 612), polyundecamide (Polyamide 11), polydodecamide (Polyamide 12), polyhexamethylene adipamide/polyhexamethylene terephthalamide copolymer (Polyamide 66/6T), polyhexamethylene adipamide/polyhexamethylene terephthalamide/polyhexamethylene isophthalamide copolymer (Polyamide 66/6T/6I), polyhexamethylene terephthalamide/polyhexamethylene isophthalamide copolymer (Polyamide 6T/6I), polyhexamethylene adipamide/polyhexamethylene isophthalamide copolymer (Polyamide 66/6I), polyhexamethylene adipamide/polyhexamethylene isophthalamide/polycaproamide copolymer (Polyamide 66/6I/6), polyxylene adipamide (Polyamide XD6), and a mixture or copolymer thereof are preferred, Polyamide 6, Polyamide 66, Polyamide 11, Polyamide 12, Polyamide 610, Polyamide 612, Polyamide 6/66 copolymer, Polyamide 66/6I copolymer, and Polyamide 66/6I/6 copolymer are more preferred, Polyamide 6, Polyamide 66, Polyamide 11, Polyamide 12, Polyamide 610, Polyamide 612, and Polyamide 6/66 are even more preferred, and Polyamide 6, Polyamide 66, Polyamide 11, and Polyamide 12 are even more preferred.

<10> The polyamide resin composition according to any one of the above <1> to <9>, wherein the content of the polyamide resin of the polyamide resin composition is preferably 30% by mass or more, more preferably 40% by mass or more, even more preferably 50% by mass or more, even more preferably 55% by mass or more, and even more preferably 60% by mass or more, and preferably 90% by mass or less, more preferably 80% by mass or less, even more preferably 75% by mass or less, and even more preferably 70% by mass or less.

<11> The polyamide resin composition according to any one of the above <1> to <10>, wherein as the plasticizer, one or more members selected from the group consisting of amide-based plasticizers, ester-based plasticizers, and amide ester-based plasticizers are preferred.

<12> The polyamide resin composition according to the above <11>, wherein as the amide-based plasticizers, one or more members selected from the group consisting of carboxylic acid amide-based plasticizers and sulfonamide-based plasticizers are preferred.

<13> The polyamide resin composition according to the above <11>, wherein as the ester-based plasticizer, one or more members selected from the group consisting of monoester-based plasticizers, diester-based plasticizers, triester-based plasticizers, and polyester-based plasticizers are preferred.

<14> The polyamide resin composition according to the above <11>, wherein as the amide ester-based plasticizer, one or more members selected from the group consisting of compounds of one or more acids selected from the group consisting of phthalic acid, trimellitic acid, pyromellitic acid and anhydrides thereof, a dialkylamine of which alkyl group has from 2 to 8 carbon atoms, and an aliphatic alcohol having from 6 to 20 carbon atoms or an alkylene oxide adduct (the number of moles of alkylene oxide added is 10 mol or less) of which alkylene oxide has from 2 to 4 carbon atoms of the aliphatic alcohol are preferred.

<15> The polyamide resin composition according to any one of the above <11> to <14>, wherein the content of one or more members selected from the group consisting of amide-based plasticizers, ester-based plasticizers, and amide ester-based plasticizers is preferably 50% by mass or more, more preferably 80% by mass or more, even more preferably 90% by mass or more, even more preferably 95% by mass or more, even more preferably substantially 100% by mass, and even more preferably 100% by mass, of the plasticizer.

<16> The polyamide resin composition according to any one of the above <1> to <15>, wherein the content of the plasticizer, based on 100 parts by mass of the polyamide resin, is preferably 10 parts by mass or more, and more preferably 15 parts by mass or more, and preferably 30 parts by mass or less, more preferably 25 parts by mass or less, even more preferably 20 parts by mass or less, and even more preferably 18 parts by mass or less.

<17> The polyamide resin composition according to any one of the above <1> to <16>, wherein the content of the plasticizer of the polyamide resin composition is preferably 5% by mass or more, more preferably 8% by mass or more, even more preferably 9% by mass or more, and even more preferably 10% by mass or more, and preferably 30% by mass or less, more preferably 20% by mass or less, and even more preferably 15% by mass or less.

<18> The polyamide resin composition according to any one of the above <1> to <17>, wherein the plate-like filler has an aspect ratio (length of the longest side of the largest surface of the plate-like filler/thickness of the surface) of 2 or more and 150 or less, and a ratio of length to breadth of a cross section approximately orthogonal to an axis extending in a longitudinal direction (cross-sectional ratio of length to breadth) calculated by the following formula:

Cross-sectional ratio of length to breadth=largest length to smallest breadth in a cross section approximately orthogonal to an axis extending in a longitudinal direction of 2 or more and less than 150, and glass flake, non-swellable mica, swellable mica, graphite, metal foil, talc, clay, mica, sericite, zeolite, bentonite, organic modified bentonite, montmorillonite, organic modified montmorillonite, dolomite, smectite, hydrotalcite, plate-like iron oxide, plate-like calcium carbonate, plate-like magnesium hydroxide, or plate-like barium sulfate is preferred, talc, mica, or plate-like barium sulfate is more preferred, talc or mica is even more preferred, and talc is even more preferred.

<19> The polyamide resin composition according to any one of the above <1> to <18>, wherein the acicular filler has an aspect ratio (particle length/particle size) within the range of 2 or more and 150 or less and a ratio of length to breadth in a cross section (cross-sectional ratio of length to breadth) calculated by the above formula of 1 or more and less than 2, and potassium titanate whiskers, aluminum borate whiskers, magnesium-based whiskers, silicon-based whiskers, wollastonite, sepiolite, asbestos, zonolite, phosphate fibers, ellestadite, slag fibers, gypsum fibers, silica fibers, silica alumina fibers, zirconia fibers, boron nitride fibers, silicon nitride fibers, and boron fibers are preferred, and potassium titanate whiskers and wollastonite are more preferred.

<20> The polyamide resin composition according to any one of the above <1> to <19>, wherein the content of one or more members selected from the group consisting of plate-like fillers and acicular fillers is, based on 100 parts by mass of the polyamide resin, preferably 20 parts by mass or more, more preferably 25 parts by mass or more, and even more preferably 30 parts by mass or more, and preferably 60 parts by mass or less, and more preferably 50 parts by mass or less.

<21> The polyamide resin composition according to any one of the above <1> to <20>, wherein the content of one or more members selected from the group consisting of plate-like fillers and acicular fillers in the filler used in the present invention is preferably 50% by mass or more, more preferably 70% by mass or more, even more preferably 80% by mass or more, even more preferably 90% by mass or more, even more preferably 95% by mass or more, even more preferably substantially 100% by mass, and even more preferably 100% by mass.

<22> The polyamide resin composition according to any one of the above <1> to <21>, further containing preferably one or more members selected from the group consisting of fibrous fillers and granular fillers, and containing more preferably one or more members of fibrous fillers.

<23> The polyamide resin composition according to the above <22>, wherein the fibrous filler has an aspect ratio (average fiber length/average fiber diameter) of exceeding 150, and glass fibers, carbon fibers, graphite fibers, metal fibers, and cellulose fibers are preferred, carbon fibers and glass fibers are more preferred, and glass fibers are even more preferred.

<24> The polyamide resin composition according to the above <22> or <23>, wherein the content of the fibrous filler is, based on 100 parts by mass of the polyamide resin, preferably 1 part by mass or more, and more preferably 3 parts by mass or more, and preferably 20 parts by mass or less, more preferably 10 parts by mass or less, and even more preferably 7 parts by mass or less.

<25> The polyamide resin composition according to any one of the above <22> to <24>, wherein the content of the fibrous filler in the filler used in the present invention is preferably 3% by mass or more, more preferably 5% by mass or more, and even more preferably 10% by mass or more, and preferably 30% by mass or less, more preferably 20% by mass or less, and even more preferably 15% by mass or less.

<26> The polyamide resin composition according to any one of the above <22> to <25>, wherein the mass ratio of one or more fillers selected from the group consisting of plate-like fillers and acicular fillers to the fibrous filler [(plate-like filler+acicular filler)/fibrous filler] is preferably from 70/30 to 95/5, more preferably from 80/20 to 90/10, and even more preferably from 85/15 to 90/10.

<27> The polyamide resin composition according to the above <22>, wherein the granular filler has an aspect ratio (longest diameter of the granular filler/shortest diameter of the granular filler) of 1 or more and less than 2, the aspect ratio of nearly 1 is preferred, and kaolin, fine silicic acid powder, feldspar powder, granular calcium carbonate, granular magnesium hydroxide, granular barium sulfate, aluminum hydroxide, magnesium carbonate, calcium oxide, aluminum oxide, magnesium oxide, titanium oxide, aluminum silicate, various balloons, various beads, silicon oxide, gypsum, novaculite, dawsonite, and white clay are preferred, granular barium sulfate, aluminum hydroxide, and granular calcium carbonate are more preferred, and granular calcium carbonate and granular barium sulfate are even more preferred.

<28> The polyamide resin composition according to the above <22> or <27>, wherein the content of the granular filler is, based on 100 parts by mass of the polyamide resin, preferably 3 parts by mass or more, and more preferably 4 parts by mass or more, and preferably 50 parts by mass or less, more preferably 30 parts by mass or less, even more preferably 15 parts by mass or less, even more preferably 10 parts by mass or less, and even more preferably 6 parts by mass or less.

<29> The polyamide resin composition according to any one of the above <1> to <28>, wherein the plate-like, granular, or acicular filler may be subjected to a coating or binding treatment with a thermoplastic resin such as an ethylene/vinyl acetate copolymer, or with a thermosetting resin such as an epoxy resin, or the filler may be treated with a coupling agent such as amino silane or epoxy silane.

<30> The polyamide resin composition according to any one of the above <22> to <29>, wherein it is preferable that one or more members selected from the group consisting of plate-like fillers and acicular fillers are used in combination with one or more members selected from the group consisting of granular fillers and fibrous fillers, and it is more preferable that one or more members selected from the group consisting of plate-like fillers and acicular fillers are used in combination with one or more members of fibrous fillers.

<31> The polyamide resin composition according to any one of the above <1> to <30>, wherein a total content of fillers used is, based on 100 parts by mass of the polyamide resin, preferably 20 parts by mass or more, more preferably 25 parts by mass or more, even more preferably 30 parts by mass or more, and even more preferably 35 parts by mass or more, and preferably 55 parts by mass or less, and more preferably 50 parts by mass or less.

<32> The polyamide resin composition according to any one of the above <1> to <31>, wherein a total content of fillers used in the polyamide resin composition is preferably 10% by mass or more, more preferably 15% by mass or more, and even more preferably 20% by mass or more, and preferably 45% by mass or less, more preferably 40% by mass or less, even more preferably 35% by mass or less, and even more preferably 30% by mass or less.

<33> The polyamide resin composition according to any one of the above <1> to <32>, wherein the mass ratio of the plasticizer to one or more fillers selected from the group consisting of plate-like fillers and acicular fillers [plasticizer/(plate-like filler+acicular filler)] is preferably from 0.15 to 0.8, more preferably from 0.25 to 0.6, and even more preferably from 0.3 to 0.4.

<34> The polyamide resin composition according to any one of the above <1> to <33>, further containing an organic crystal nucleating agent.

<35> The polyamide resin composition according to the above <34>, wherein the content of the organic crystal nucleating agent is, based on 100 parts by mass of the polyamide resin, preferably 0.01 parts by mass or more, more preferably 0.1 parts by mass or more, and even more preferably 0.5 parts by mass or more, and preferably 30 parts by mass or less, more preferably 20 parts by mass or less, even more preferably 10 parts by mass or less, even more preferably 5 parts by mass or less, and even more preferably 3 parts by mass or less.

<36> The polyamide resin composition according to any one of the above <1> to <35>, further containing a styrene-isoprene block copolymer.

<37> The polyamide resin composition according to the above <36>, wherein the content of the styrene-isoprene block copolymer is, based on 100 parts by mass of the polyamide resin, preferably 3 parts by mass or more, more preferably 5 parts by mass or more, even more preferably 10 parts by mass or more, and even more preferably 13 parts by mass or more, and preferably 40 parts by mass or less, more preferably 30 parts by mass or less, and even more preferably 20 parts by mass or less.

<38> The polyamide resin composition according to any one of the above <1> to <37>, prepared by melt-kneading raw materials containing a polyamide resin, a plasticizer in an amount of from 7 to 35 parts by mass, one or more members selected from plate-like fillers and acicular fillers in an amount of from 15 to 80 parts by mass, and further optionally various additives, based on 100 parts by mass of the polyamide resin.

<39> The polyamide resin composition according to the above <38>, wherein the melt-kneading temperature is preferably 220° C. or higher, more preferably 225° C. or higher, and even more preferably 230° C. or higher, and preferably 300° C. or lower, more preferably 290° C. or lower, even more preferably 280° C. or lower, even more preferably 260° C. or lower, even more preferably 250° C. or lower, and even more preferably 240° C. or lower.

<40> Use of a polyamide resin composition as defined in any one of the above <1> to <39> as a vibration-damping material.

<41> A manufactured article such as audio equipment, electric appliances, transportation vehicles, construction buildings, and industrial equipment, obtainable by molding a polyamide resin composition as defined in any one of the above <1> to <39>, or parts or housing thereof.

<42> A method for producing parts or housing, including the following steps:

step (1): melt-kneading a polyamide resin composition containing a polyamide resin, a plasticizer in an amount of from 7 to 35 parts by mass, and one or more members selected from plate-like fillers and acicular fillers in an amount of from 15 to 80 parts by mass, based on 100 parts by mass of the polyamide resin, to prepare a melt-kneaded product of a polyamide resin composition; and step (2): injection-molding the melt-kneaded product of a polyamide resin composition obtained in the step (1) in a mold.

EXAMPLES

The present invention will be described more specifically by means of the following Examples. The examples are given solely for the purposes of illustration and are not to be construed as limitations of the present invention. Parts in Examples are parts by mass unless specified otherwise. Here, "ambient pressure" means 101.3 kPa, and "ambient temperature" means 25° C.

[Glass Transition Temperature of Polyamide Resin]

Using a DMA apparatus (EXSTAR6000, manufactured by SII), a flat test piece (40 mm×5 mm×0.4 mm) of the samples prepared in the same manner as described later is heated from −20° C. to 250° C. at a heating rate of 2° C./min at a measurement frequency of 1 Hz, and a peak temperature of the resulting loss tangent is obtained as a glass transition point.

[Crystallization Enthalpy of Polyamide Resin]

About 7.5 mg of a polyamide resin sample is weighed, and using a DSC apparatus (DSC8500, manufactured by Perkin-Elmer), a crystallization enthalpy is calculated from exothermic peaks accompanying crystallization when a resin is, as prescribed in JIS K7122 (1999), heated from 25° C. to 300° C. at a heating rate of 20° C./min, held in that state for 5 minutes, and thereafter cooled to 25° C. or lower at a rate of −20° C./min.

Examples 1 to 17 and Comparative Examples 1 to 14

Raw materials for polyamide resin compositions as listed in Tables 1 to 4 were melt-kneaded at 240° C. with an intermeshing co-rotating twin-screw extruder, TEX-28V manufactured by The Japan Steel Works, Ltd., and strand-cut, to provide pellets of the polyamide resin compositions. Here, the pellets obtained were subjected to dehumidification drying at 110° C. for 3 hours, to adjust its water content to 500 ppm or less.

The pellets obtained were injection-molded with an injection-molding machine, J110AD-180H manufactured by The Japan Steel Works, Ltd., cylinder temperatures set at 6 locations, of which cylinder temperature was set at 240° C. for the sections up to fifth units from the nozzle end side, at 170° C. for the remaining one unit, and at 45° C. for the section below the hopper, to mold into rectangular test pieces (63 mm×13 mm×6.4 mm), rectangular test pieces (125 mm×12 mm×6 mm) and flat plate test pieces (127 mm×12.7 mm×1.2 mm) at a mold temperature set to 80° C., to provide a molded article of the polyamide resin composition.

Examples 18 to 19 and Comparative Examples 15 to 17

Raw materials for polyamide resin compositions as listed in Table 5 were melt-kneaded at 280° C. with an intermeshing co-rotating twin-screw extruder, TEX-28V manufactured by The Japan Steel Works, Ltd., and strand-cut, to provide pellets of the polyamide resin compositions. Here, the pellets obtained were subjected to dehumidification drying at 110° C. for 3 hours, to adjust its water content to 500 ppm or less.

The pellets obtained were injection-molded with an injection-molding machine, J110AD-180H manufactured by The Japan Steel Works, Ltd., cylinder temperatures set at 6 locations, of which cylinder temperature was set at 275° C. for the sections up to fifth units from the nozzle end side, at 230° C. for the remaining one unit, and at 45° C. for the section below the hopper, to mold into rectangular test pieces (63 mm×13 mm×6.4 mm), rectangular test pieces (125 mm×12 mm×6 mm), flat plate test pieces (127 mm×12.7 mm×1.2 mm), and flat plate test pieces (70 mm×40 mm×2 mm) at a mold temperature set to 80° C., to provide a molded article of the polyamide resin composition.

Here, the raw materials in Tables 1 to 5 are as follows.
[Polyamide Resin]
6 Nylon: Polycaproamide, AMILAN CM1017 manufactured by Toray Industries Inc., glass transition temperature: 50° C., crystallization enthalpy ΔHmc: 57 J/g
66 Nylon: Copolymer of hexamethylenediamine and adipic acid, AMILAN CM3001-N manufactured by Toray Industries Inc., glass transition temperature: 55° C., crystallization enthalpy ΔHmc: 59 J/g
[Plasticizer]
Initial Condensed Product: ε-Caprolactam, UBE Caprolactam manufactured by UBE Industries, Inc.
BBSA: N-Butylbenzenesulfonamide, BM-4 manufactured by DAIHACHI CHEMICAL INDUSTRY CO., LTD.
POBO: 2-Ethylhexyl p-oxybenzoate manufactured by Tokyo Chemical Industry Co., Ltd.
HDPB: 2-Hexyldecyl p-oxybenzoate, EXCEPARL HDPB manufactured by KAO Corporation
[Filler]
Zinc Flower: F-1 manufactured by HAKUSUI TECH, average particle size: 0.1 μm, aspect ratio: 1.2
Barium Sulfate (granular): B-1 manufactured by Sakai Chemical Industry Co., Ltd., average particle size: 0.8 μm, aspect ratio: 1.6
Calcium Carbonate: NCC-A manufactured by NITTO FUNKA KOGYO K.K., average particle size: 2.2 μm, aspect ratio: 1.3
Aluminum Hydroxide: B703 manufactured by Nippon Light Metal Company, Ltd., average particle size: 3.5 μm, aspect ratio: 1.5
Talc: MICROACE P-6 manufactured by Nippon Talc Co., Ltd., length of the longest side of the largest surface: 4 μm, thickness of the largest surface: 0.13 μm, aspect ratio: 31, cross-sectional ratio of length to breadth: 5.6
Mica: A-21S manufactured by YAMAGUCHI MICA CO., LTD., length of the longest side of the largest surface: 23 μm, thickness of the largest surface: 0.33 μm, aspect ratio: 70, cross-sectional ratio of length to breadth: 13
Barium Sulfate (plate-like): B-54 manufactured by Sakai Chemical Industry Co., Ltd., length of the longest side of the largest surface: 1 μm, thickness of the largest surface: 0.17 μm, aspect ratio: 6, cross-sectional ratio of length to breadth: 4.1
Wollastonite: NYAD 325 manufactured by NYCO, particle length: 50 particle size: 10 μm, aspect ratio: 5, cross-sectional ratio of length to breadth: 1.7
Glass Fibers: CSF 3PE-941 manufactured by Nittobo, average fiber length: 3 mm, average fiber diameter: 13 μm, aspect ratio: 231
[Organic Crystal Nucleating Agent]
Sodium Stearate: One manufactured by Wako Pure Chemical Industries, Ltd., average particle size: 7 μm
[Styrene-Isoprene Block Copolymer]
HYBRAR 5127 manufactured by Kuraray Plastics Co., Ltd., glass transition temperature: 8° C., styrene content: 20% by mass The properties of the molded articles obtained were evaluated in accordance with the methods of the following Test Examples 1 to 3. The results are shown in Tables 1 to 5.

Test Example 1—Izod Impact Resistance

As to rectangular test pieces having dimensions of 63 mm×13 mm×6.4 mm, to which a 13 mm notch was provided, an impact test was carried out with an Izod impact tester manufactured by YASUDA SEIKI SEISAKUSHO LTD. as prescribed in JIS K7110. It can be judged that the impact resistance is high when the Izod impact resistance is 40 J/m or more, and it can be judged that the higher the numerical value, the higher the effects.

Test Example 2—Flexural Modulus

As to rectangular test pieces having dimensions of 125 mm×12 mm×6 mm, as prescribed in JIS K7203, a flexural test was carried out with TENSILON, TENSILON Tensile Tester RTC-1210A manufactured by Orientec Co., LTD. with setting a crosshead speed to 3 mm/min to obtain a flexural modulus. It can be judged that a flexural modulus is high, and an initial amplitude of vibration is small when a flexural modulus is 1.6 GPa or more, and it can be judged that the higher the numerical value, the higher the effects.

Test Example 3—Loss Tangent

As to flat test pieces having dimensions of 127 mm×12.7 mm×1.2 mm, as prescribed to JIS G0602, a test piece was fixed to a jig as shown in FIG. 1, and loss tangent was obtained from free damped vibration waveform of flexural vibration by free-fixed impact vibration testing. Maximum $X_n$ of response displacement was detected with a CCD Laser Displacement Sensor, LK-GD5000 manufactured by KEYENCE, and analyzed over time with a FFT Analyzer, Photon II manufactured by ARBROWN CO., LTD. The calculated zone of the response displacement was set at from 3.0 mm to 0.5 mm exception for the response displacement at the time of the initial impact. It can be judged that the loss tangent is high and the damping of vibration is fast when the loss tangent is 0.06 or more, and it can be judged that the higher the numerical value, the higher the effects.

TABLE 1

| | | | \multicolumn{10}{c}{Examples} |
|---|---|---|---|---|---|---|---|---|---|---|---|---|
| | | | 1 | 2 | 3 | 4 | 5 | 6 | 7 | 8 | 9 | 10 |
| Polyamide Resin | | 6 Nylon | 100 | 100 | 100 | 100 | 100 | 100 | 100 | 100 | 100 | 100 |
| Plasticizer | | Initial Condensed Product | — | — | — | — | — | — | — | — | — | — |
| | | BBSA | 15 | 15 | 15 | 15 | 15 | 15 | 15 | 10 | 20 | 30 |
| | | POBO | — | — | — | — | — | — | — | — | — | — |
| | | HDPB | — | — | — | — | — | — | — | — | — | — |
| Filler | Granular Filler | Zinc Flower | — | — | — | — | — | — | — | — | — | — |
| | | Barium Sulfate (granular) | — | — | — | — | — | — | — | — | — | — |
| | | Calcium Carbonate | — | — | — | — | — | — | — | — | — | — |
| | | Aluminum Hydroxide | — | — | — | — | — | — | — | — | — | — |
| | Plate-Like Filler | Talc | 20 | 40 | 60 | 80 | — | — | — | 40 | 40 | 40 |
| | | Mica | — | — | — | — | 40 | — | — | — | — | — |
| | | Barium Sulfate (plate-like) | — | — | — | — | — | 40 | — | — | — | — |
| | Acicular Filler | Wollastonite | — | — | — | — | — | — | 40 | — | — | — |
| | Fibrous Filler | Glass Fibers | — | — | — | — | — | — | — | — | — | — |
| Organic Crystal Nucleating Agent | | Sodium Stearate | — | — | — | — | — | — | — | — | — | — |
| Content of Polyamide Resin in Resin Composition (% by mass) | | | 74.1 | 64.5 | 57.1 | 51.3 | 64.5 | 64.5 | 64.5 | 66.7 | 62.5 | 58.8 |
| Property | Toughness | Izod Impact Resistance (J/m) | 77 | 66 | 55 | 50 | 59 | 70 | 68 | 60 | 72 | 80 |
| | Rigidity | Flexural Modulus (GPa) | 2.0 | 2.8 | 4.1 | 4.4 | 3.8 | 2.2 | 2.3 | 3.1 | 2.6 | 2.4 |
| | Vibration-Damping Property | Loss Tangent | 0.110 | 0.110 | 0.097 | 0.090 | 0.090 | 0.088 | 0.086 | 0.095 | 0.115 | 0.120 |

* The amount of raw materials used is expressed in parts by mass.

TABLE 2

| | | | \multicolumn{7}{c}{Examples} |
|---|---|---|---|---|---|---|---|---|---|
| | | | 11 | 12 | 13 | 14 | 15 | 16 | 17 |
| Polyamide Resin | | 6 Nylon | 100 | 100 | 100 | 100 | 100 | 100 | 100 |
| Plasticizer | | Initial Condensed Product | — | — | — | — | — | — | — |
| | | BBSA | 15 | 15 | 15 | — | — | 15 | 15 |
| | | POBO | — | — | — | 15 | — | — | — |
| | | HDPB | — | — | — | — | 15 | — | — |
| Filler | Granular Filler | Zinc Flower | — | — | — | — | — | — | — |
| | | Barium Sulfate (granular) | — | — | — | — | — | — | — |
| | | Calcium Carbonate | — | — | — | — | — | — | — |
| | | Aluminum Hydroxide | 5 | — | — | — | — | — | — |
| | Plate-Like Filler | Talc | 40 | 40 | 40 | 40 | 40 | 40 | 40 |
| | | Mica | — | — | — | — | — | — | — |

TABLE 2-continued

|  |  |  | Examples | | | | | | |
| --- | --- | --- | --- | --- | --- | --- | --- | --- | --- |
|  |  |  | 11 | 12 | 13 | 14 | 15 | 16 | 17 |
|  |  | Barium Sulfate (plate-like) | — | — | — | — | — | — | — |
|  | Acicular Filler | Wollastonite | — | — | — | — | — | — | — |
|  | Fibrous Filler | Glass Fibers | — | 10 | 5 | 5 | 5 | — | — |
| Organic Crystal Nucleating Agent | | Sodium Stearate | — | — | — | — | — | 1 | — |
| Styrene-Isoprene Block Copolymer | | HYBRAR 5127 | — | — | — | — | — | — | 15 |
| Content of Polyamide Resin in Resin Composition (% by mass) | | | 62.5 | 60.6 | 62.5 | 62.5 | 62.5 | 64.1 | 58.8 |
| Property | Toughness | Izod Impact Resistance (J/m) | 65 | 42 | 60 | 57 | 59 | 70 | 41 |
|  | Rigidity | Flexural Modulus (GPa) | 2.9 | 4.2 | 3.2 | 3.5 | 3.7 | 3.1 | 2.5 |
|  | Vibration-Damping Property | Loss Tangent | 0.101 | 0.078 | 0.103 | 0.095 | 0.092 | 0.120 | 0.115 |

* The amount of raw materials used is expressed in parts by mass.

TABLE 3

|  |  |  | Comparative Examples | | | | | | | |
| --- | --- | --- | --- | --- | --- | --- | --- | --- | --- | --- |
|  |  |  | 1 | 2 | 3 | 4 | 5 | 6 | 7 | 8 |
| Polyamide Resin | | 6 Nylon | 100 | 100 | 100 | 100 | 100 | 100 | 100 | 100 |
| Plasticizer | | Initial Condensed Product | — | — | — | — | — | — | — | — |
|  |  | BBSA | — | 15 | 5 | 40 | 15 | 15 | 15 | 15 |
|  |  | POBO | — | — | — | — | — | — | — | — |
|  |  | HDPB | — | — | — | — | — | — | — | — |
| Filler | Granular Filler | Zinc Flower | — | — | — | — | — | — | — | — |
|  |  | Barium Sulfate (granular) | — | — | — | — | — | — | — | — |
|  |  | Calcium Carbonate | — | — | — | — | — | — | — | — |
|  |  | Aluminum Hydroxide | — | — | — | — | — | — | — | — |
|  | Plate-Like Filler | Talc | — | — | 40 | 40 | 10 | 90 | — | — |
|  |  | Mica | — | — | — | — | — | — | — | — |
|  |  | Barium Sulfate (plate-like) | — | — | — | — | — | — | — | — |
|  | Acicular Filler | Wollastonite | — | — | — | — | — | — | — | — |
|  | Fibrous Filler | Glass Fibers | — | — | — | — | — | — | 40 | 45 |
| Organic Crystal Nucleating Agent | | Sodium Stearate | — | — | — | — | — | — | — | — |
| Content of Polyamide Resin in Resin Composition (% by mass) | | | 100.0 | 87.0 | 69.0 | 55.6 | 80.0 | 48.8 | 64.5 | 62.5 |
| Property | Toughness | Izod Impact Resistance (J/m) | 19 | 160 | 40 | Undeterminable | 85 | 31 | 38 | 36 |
|  | Rigidity | Flexural Modulus (GPa) | 2.1 | 1.0 | 3.5 |  | 1.3 | 4.5 | 2.3 | 2.5 |
|  | Vibration-Damping Property | Loss Tangent | 0.019 | 0.124 | 0.031 |  | 0.115 | 0.065 | 0.070 | 0.065 |

* The amount of raw materials used is expressed in parts by mass.

TABLE 4

|  |  |  | Comparative Examples | | | | | |
|---|---|---|---|---|---|---|---|---|
|  |  |  | 9 | 10 | 11 | 12 | 13 | 14 |
| Polyamide Resin | | 6 Nylon | 100 | 100 | 100 | 100 | 100 | 100 |
| Plasticizer | | Initial Condensed Product | — | — | — | — | 10 | 10 |
|  | | BBSA | 15 | 15 | 15 | 15 | — | — |
|  | | POBO | — | — | — | — | — | — |
|  | | HDPB | — | — | — | — | — | — |
| Filler | Granular Filler | Zinc Flower | 40 | — | — | — | 110 | 60 |
|  |  | Barium Sulfate (granular) | — | 40 | — | — | — | — |
|  |  | Calcium Carbonate | — | — | 40 | — | — | — |
|  |  | Aluminum Hydroxide | — | — | — | 40 | — | — |
|  | Plate-Like Filler | Talc | — | — | — | — | — | — |
|  |  | Mica | — | — | — | — | — | — |
|  |  | Barium Sulfate (plate-like) | — | — | — | — | — | — |
|  | Acicular Filler | Wollastonite | — | — | — | — | — | — |
|  | Fibrous Filler | Glass Fibers | — | — | — | — | 50 | 50 |
| Organic Crystal Nucleating Agent | | Sodium Stearate | — | — | — | — | — | — |
| Content of Polyamide Resin in Resin Composition (% by mass) | | | 64.5 | 64.5 | 64.5 | 64.5 | 37.0 | 45.5 |
| Property | Toughness | Izod Impact Resistance (J/m) | 81 | 78 | 80 | 75 | 30 | 33 |
|  | Rigidity | Flexural Modulus (GPa) | 1.3 | 1.4 | 1.3 | 1.5 | 10.0 | 8.2 |
|  | Vibration-Damping Property | Loss Tangent | 0.080 | 0.078 | 0.080 | 0.075 | 0.039 | 0.045 |

* The amount of raw materials used is expressed in parts by mass.

TABLE 5

|  |  |  | Examples | | Comparative Examples | | |
|---|---|---|---|---|---|---|---|
|  |  |  | 18 | 19 | 15 | 16 | 17 |
| Polyamide Resin | | 66 Nylon | 100 | 100 | 100 | 100 | 100 |
| Plasticizer | | Initial Condensed Product | — | — | — | — | — |
|  | | BBSA | 20 | 15 | — | — | 15 |
|  | | POBO | — | — | — | — | — |
|  | | HDPB | — | — | — | — | — |
| Filler | Granular Filler | Zinc Flower | — | — | — | — | — |
|  |  | Barium Sulfate (granular) | — | — | — | — | — |
|  |  | Calcium Carbonate | — | — | — | — | — |
|  |  | Aluminum Hydroxide | — | — | — | — | — |
|  | Plate-Like Filler | Talc | 40 | 40 | — | 40 | — |
|  |  | Mica | — | — | — | — | — |
|  |  | Barium Sulfate (plate-like) | — | — | — | — | — |
|  | Acicular Filler | Wollastonite | — | — | — | — | — |
|  | Fibrous Filler | Glass Fibers | — | — | — | — | — |
| Organic Crystal Nucleating Agent | | Sodium Stearate | — | — | — | — | — |
| Styrene-Isoprene Block Copolymer | | HYBRAR 5127 | — | 15 | — | — | — |
| Content of Polyamide Resin in Resin Composition (% by mass) | | | 62.5 | 58.8 | 100 | 71.4 | 87.0 |

TABLE 5-continued

|  |  |  | Examples | | Comparative Examples | | |
| --- | --- | --- | --- | --- | --- | --- | --- |
|  |  |  | 18 | 19 | 15 | 16 | 17 |
| Property | Toughness | Izod Impact Resistance (J/m) | 55 | 40 | 39 | 45 | 70 |
|  | Rigidity | Flexural Modulus (GPa) | 3.5 | 3.0 | 2.8 | 4.5 | 1.6 |
|  | Vibration-Damping Property | Loss Tangent | 0.085 | 0.092 | 0.015 | 0.008 | 0.090 |

\* The amount of raw materials used is expressed in parts by mass.

As a result, as shown in Tables 1 to 5, Examples 1 to 19 had high effects in all the impact resistance, flexural modulus and loss tangent as compared to Comparative Examples 1 to 17. Among them, it can be seen from the comparisons of Example 2 with Comparative Examples 7 and 8 that the toughness in addition to the rigidity and the vibration-damping property is remarkably improved because the inorganic filler is a plate-like filler. It can be seen from these results that it is possible to improve all the toughness, rigidity and vibration-damping property by blending each of a plasticizer and a plate-like filler and/or an acicular filler in specified amounts to various polyamide resins, thereby suggesting applications to various uses. In addition, it can be seen from the comparisons of Examples 2, 5 and 6 that talc is preferred among the plate-like fillers from the viewpoint of being capable of even more improving loss tangent.

INDUSTRIAL APPLICABILITY

The polyamide resin composition of the present invention can be suitably used as a vibration-damping material for a material for audio equipment such as, for example, speakers, television, radio cassette players, headphones, audio components, or microphones, and manufactured articles such as electric appliances, transportation vehicles, construction buildings, and industrial equipment, or parts or housing thereof.

The invention claimed is:

1. A polyamide resin composition for a vibration-damping material, comprising
a polyamide resin,
a plasticizer in an amount of from 7 to 35 parts by mass,
a fibrous filler, comprising one or more members selected from the group consisting of glass fibers, metal fibers, and cellulose fibers, in an amount of 1 part by mass to 7 parts by mass, and
one or more members selected from the group consisting of
plate-like fillers selected from the group consisting of glass flake, non-swellable mica, swellable mica, graphite, metal foil, talc, clay, mica, sericite, zeolite, bentonite, organic modified bentonite, montmorillonite, organic modified montmorillonite, dolomite, smectite, hydrotalcite, plate-like iron oxide, plate-like calcium carbonate, plate-like magnesium hydroxide, and plate-like barium sulfate, and
acicular fillers selected from the group consisting of potassium titanate whiskers, aluminum borate whiskers, magnesium-based whiskers, silicon-based whiskers, wollastonite, sepiolite, asbestos, zonolite, phosphate fibers, ellestadite, slag fibers, gypsum fibers, silica fibers, silica alumina fibers, zirconia fibers, boron nitride fibers, silicon nitride fibers, and boron fibers,
in an amount of from 15 to 80 parts by mass,
based on 100 parts by mass of the polyamide resin,
wherein said plasticizer contains one or more members selected from the group consisting of:
(1) a carboxylic acid amide-based plasticizer which contains amides of one or more acids selected from the group consisting of benzoic acid, phthalic acid, trimellitic acid, pyromellitic acid and anhydrides thereof, and a dialkylamine of which alkyl group has from 2 to 8 carbon atoms,
(2) a sulfonamide-based plasticizer,
(3) an ester-based plasticizer, and
(4) an amide ester-based plasticizer.

2. The polyamide resin composition according to claim 1, wherein the polyamide resin comprises one or more members selected from the following (1) to (3):
(1) a copolymer of a polycondensate of a diamine and a dicarboxylic acid;
(2) a polymer of a polycondensate of a lactam or an aminocarboxylic acid; and
(3) a polymer comprising two or more members selected from the group consisting of (1) and (2).

3. The polyamide resin composition according to claim 1, wherein the content of the polyamide resin is 30% by mass or more and 80% by mass or less in the polyamide resin composition.

4. The polyamide resin composition according to claim 1, wherein the plasticizer comprises one or more members selected from the group consisting of the carboxylic acid amide-based plasticizer, the ester-based plasticizer, and the amide ester-based plasticizer.

5. The polyamide resin composition according to claim 4, wherein the ester-based plasticizer comprises one or more members selected from the group consisting of monoester-based plasticizers, diester-based plasticizers, triester-based plasticizers, and polyester-based plasticizers.

6. The polyamide resin composition according to claim 1, wherein the content of the plasticizer is 10 parts by mass or more and 25 parts by mass or less, based on 100 parts by mass of the polyamide resin.

7. The polyamide resin composition according to claim 1, further comprising an organic crystal nucleating agent.

8. The polyamide resin composition according to claim 1, wherein the content of the one or more members selected from the group consisting of
plate-like fillers selected from the group consisting of glass flake, non-swellable mica, swellable mica, graphite, metal foil, talc, clay, mica, sericite, zeolite, bentonite, organic modified bentonite, montmorillonite, organic modified montmorillonite, dolomite, smectite, hydrotalcite, plate-like iron oxide, plate-like calcium carbonate, plate-like magnesium hydroxide, and plate-like barium sulfate, and acicular fillers selected from the group consisting of potassium titanate whiskers, aluminum borate whiskers, magnesium-based whiskers, silicon-based whiskers, wollastonite, sepiolite, asbestos, zonolite, phosphate fibers, ellestadite, slag fibers, gypsum fibers, silica fibers, silica alumina fibers, zirconia fibers, boron nitride fibers, silicon nitride fibers, and boron fibers, is 15 parts by mass or more and 60 parts by mass or less, based on 100 parts by mass of the polyamide resin.

9. The polyamide resin composition according to claim 1, wherein the content of the one or more members selected from the group consisting of plate-like fillers selected from the group consisting of glass flake, non-swellable mica, swellable mica, graphite, metal foil, talc, clay, mica, sericite, zeolite, bentonite, organic modified bentonite, montmorillonite, organic modified montmorillonite, dolomite, smectite, hydrotalcite, plate-like iron oxide, plate-like calcium carbonate, plate-like magnesium hydroxide, and plate-like barium sulfate, and acicular fillers selected from the group consisting of potassium titanate whiskers, aluminum borate whiskers, magnesium-based whiskers, silicon-based whiskers, wollastonite, sepiolite, asbestos, zonolite, phosphate fibers, ellestadite, slag fibers, gypsum fibers, silica fibers, silica alumina fibers, zirconia fibers, boron nitride fibers, silicon nitride fibers, and boron fibers, is from 15 to 40 parts by mass, based on 100 parts by mass of the polyamide resin.

10. A vibration-damping material comprising a polyamide resin composition as defined in claim 1.

11. A method of damping vibration in audio equipment, an electronic appliance, a transportation vehicle, a construction building, or industrial equipment, which method comprises incorporating into said audio equipment, electronic appliance, transportation vehicle, construction building, or industrial equipment a polyamide resin composition as defined in claim 1 as a vibration-damping material.

12. A manufactured article selected from audio equipment, electric appliances, transportation vehicles, construction buildings, and industrial equipment, or parts or housing thereof, obtained by molding a polyamide resin composition as defined in claim 1.

13. A method for producing parts or housing, comprising the following steps:

step (1): melt-kneading a polyamide resin composition comprising a polyamide resin, a plasticizer in an amount of from 7 to 35 parts by mass, a fibrous filler, comprising one or more members selected from the group consisting of glass fibers, metal fibers, and cellulose fibers, in an amount of 1 part by mass to 7 parts by mass, and one or more members selected from the group consisting of plate-like fillers selected from the group consisting of glass flake, non-swellable mica, swellable mica, graphite, metal foil, talc, clay, mica, sericite, zeolite, bentonite, organic modified bentonite, montmorillonite, organic modified montmorillonite, dolomite, smectite, hydrotalcite, plate-like iron oxide, plate-like calcium carbonate, plate-like magnesium hydroxide, and plate-like barium sulfate, and acicular fillers selected from the group consisting of potassium titanate whiskers, aluminum borate whiskers, magnesium-based whiskers, silicon-based whiskers, wollastonite, sepiolite, asbestos, zonolite, phosphate fibers, ellestadite, slag fibers, gypsum fibers, silica fibers, silica alumina fibers, zirconia fibers, boron nitride fibers, silicon nitride fibers, and boron fibers, in an amount of from 15 to 80 parts by mass, based on 100 parts by mass of the polyamide resin, to prepare a melt-kneaded product of a polyamide resin composition; and step (2): injection-molding the melt-kneaded product of a polyamide resin composition obtained in the step (1) in a mold, wherein said plasticizer contains one or more members selected from the group consisting of:

(1) a carboxylic acid amide-based plasticizer which is amides of one or more acids selected from the group consisting of benzoic acid, phthalic acid, trimellitic acid, pyromellitic acid and anhydrides thereof, and a dialkylamine of which alkyl group has from 2 to 8 carbon atoms, (2) a sulfonamide-based plasticizer, (3) an ester-based plasticizer, and (4) an amide ester-based plasticizer.

* * * * *